March 6, 1962 C. E. SCHOU 3,023,640
DRIVE MECHANISM
Filed March 9, 1956 22 Sheets-Sheet 1
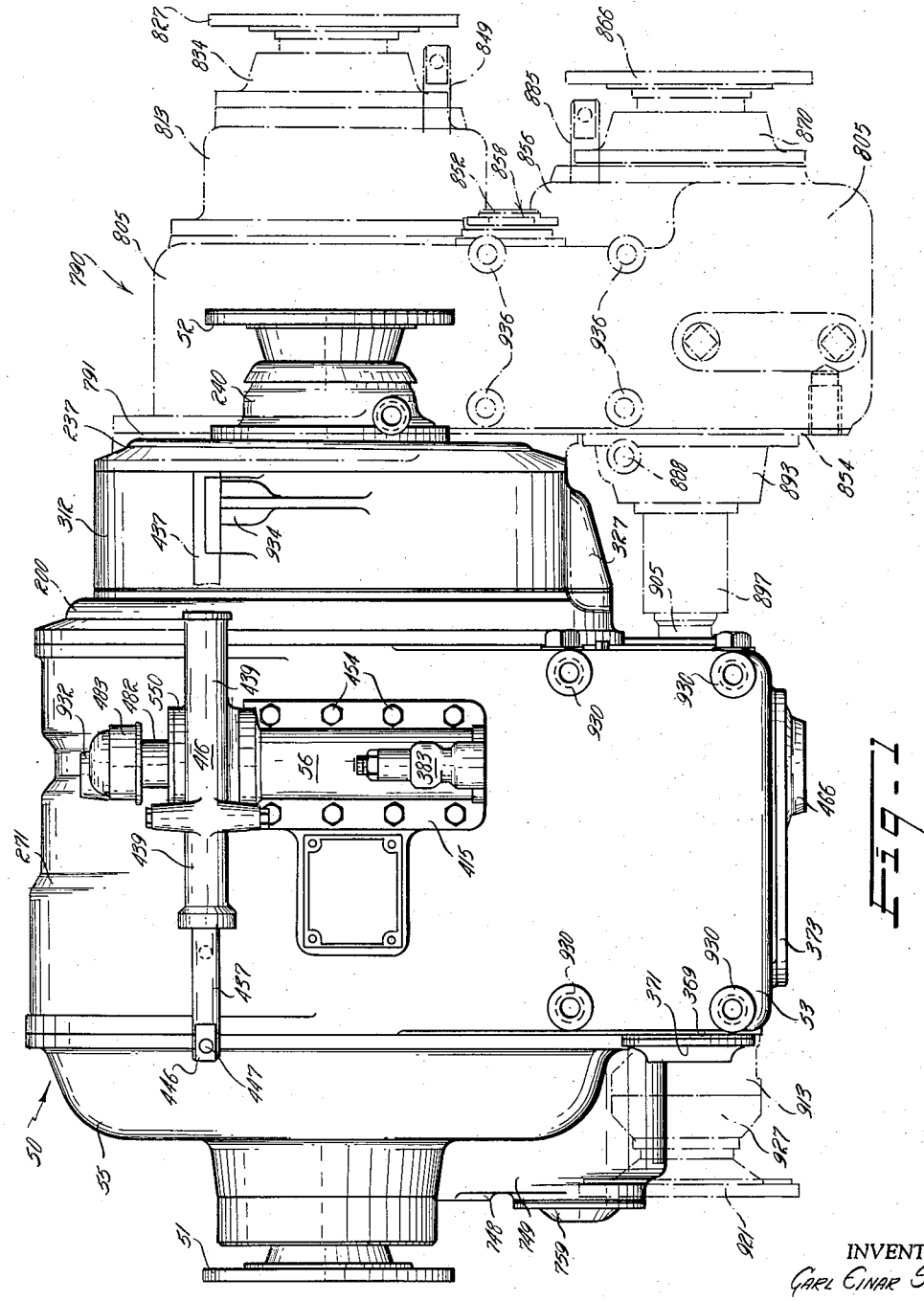
INVENTOR
CARL EINAR SCHOU
BY
ATTORNEYS March 6, 1962 C. E. SCHOU 3,023,640
DRIVE MECHANISM
Filed March 9, 1956 22 Sheets-Sheet 2

INVENTOR
CARL EINAR SCHOU
BY
Strauch, Nolan & Neale
ATTORNEYS

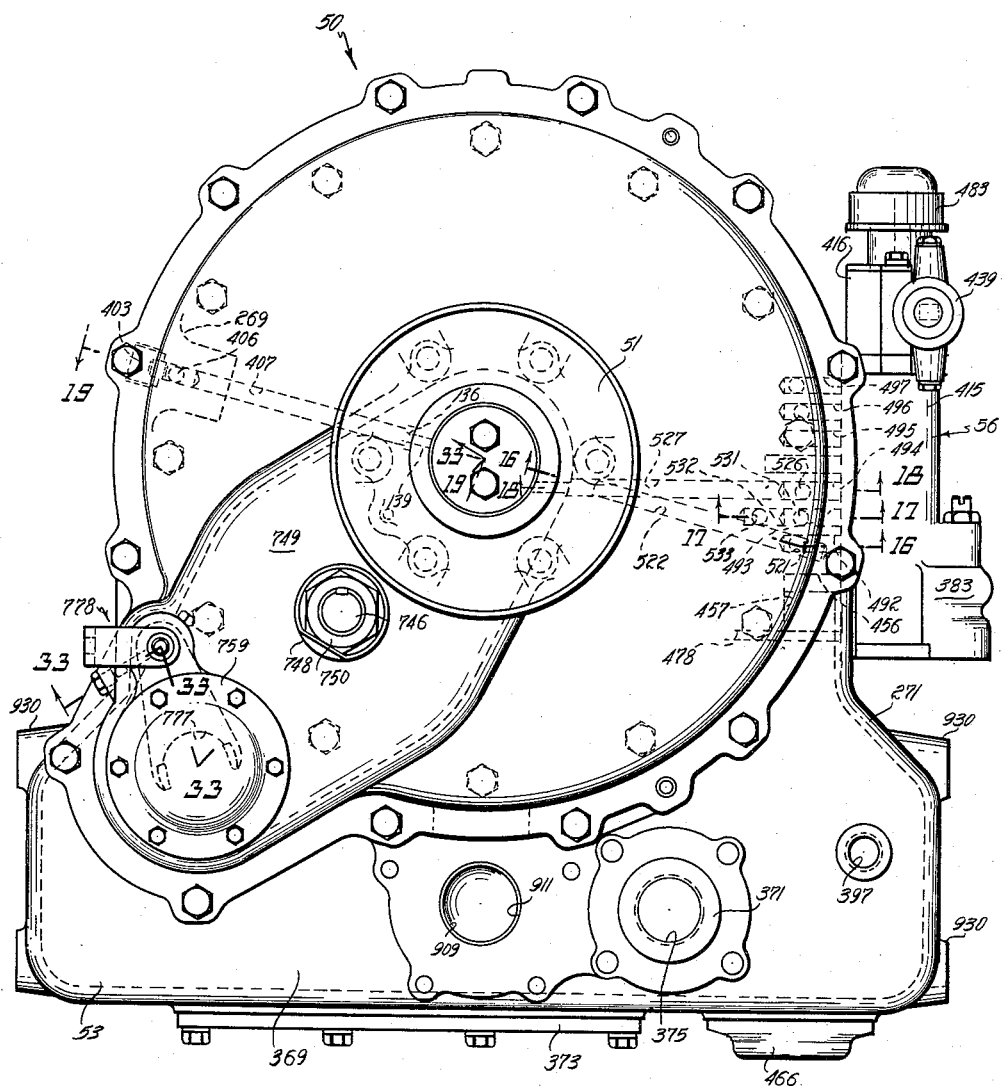

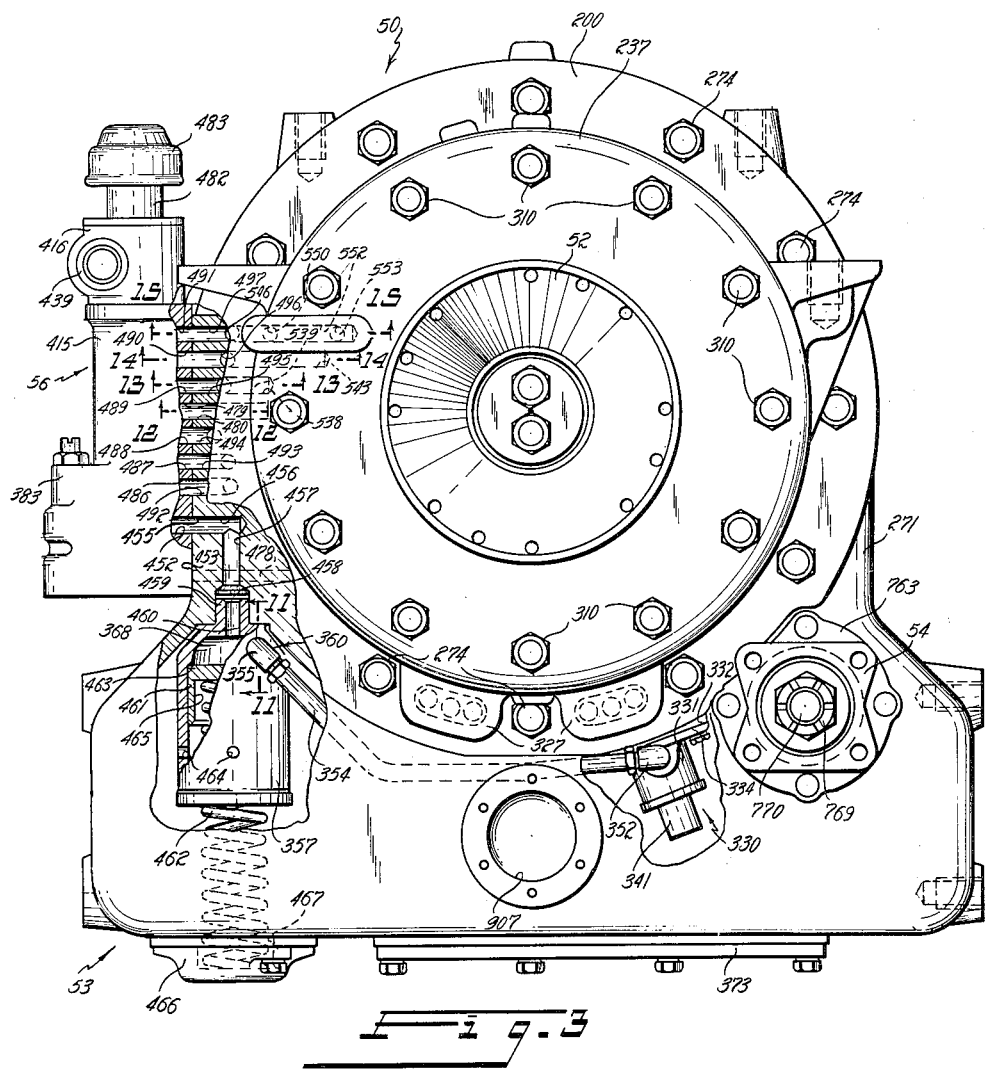

March 6, 1962
C. E. SCHOU
3,023,640
DRIVE MECHANISM
Filed March 9, 1956
22 Sheets-Sheet 5
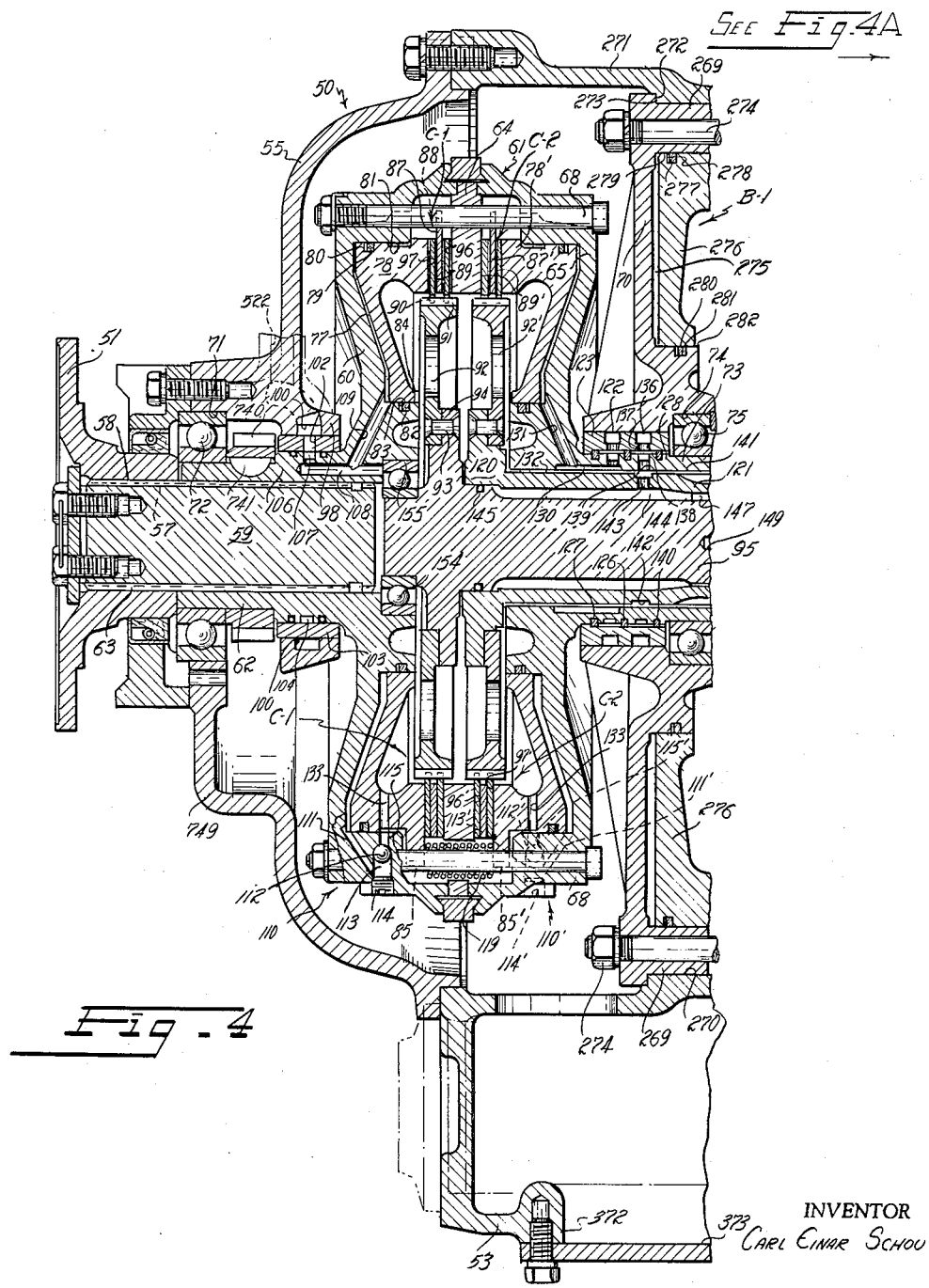
INVENTOR
CARL EINAR SCHOU
BY Strauch, Nolan & Neale
ATTORNEYS March 6, 1962 C. E. SCHOU 3,023,640
DRIVE MECHANISM
Filed March 9, 1956 22 Sheets-Sheet 6

Fig. 4A

INVENTOR
CARL EINAR SCHOU
BY Strauch, Nolan & Neale
ATTORNEYS

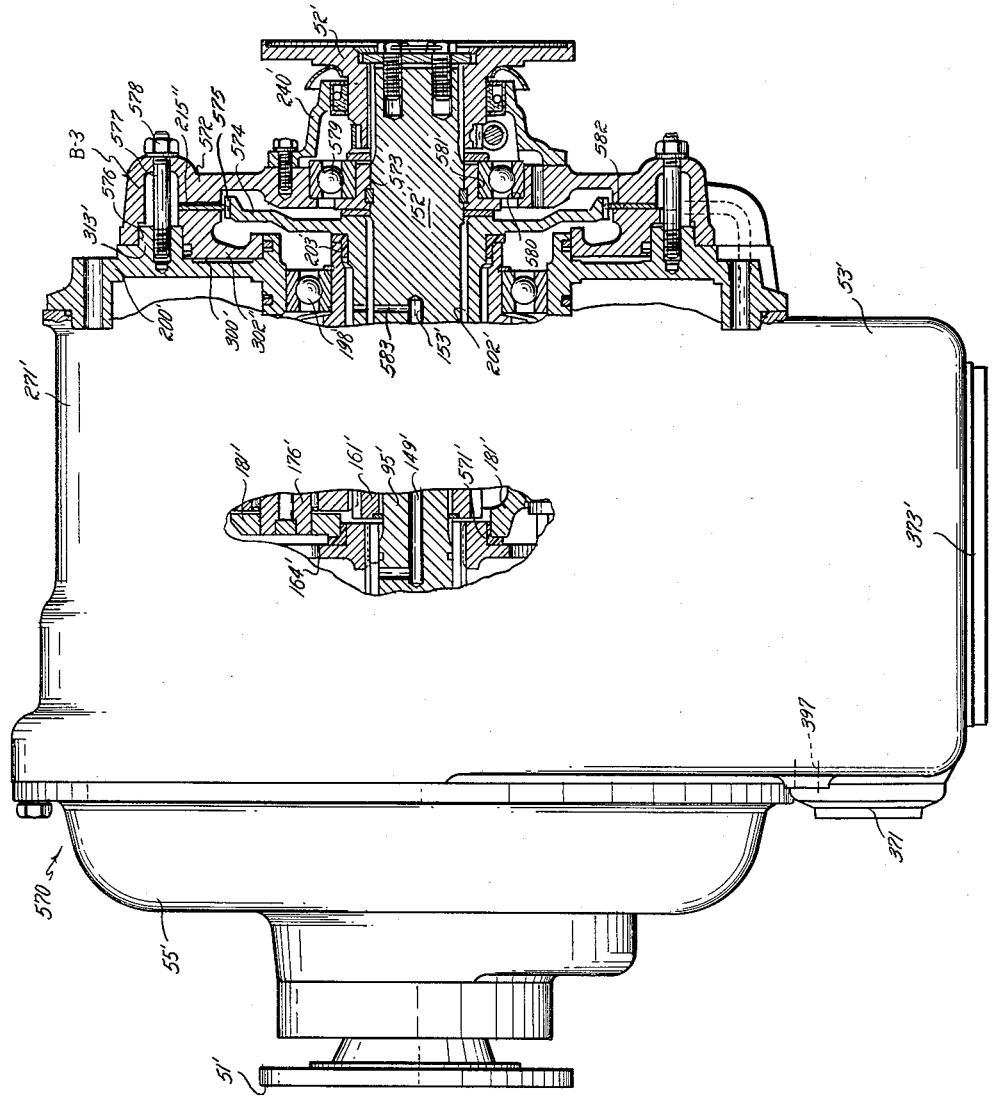

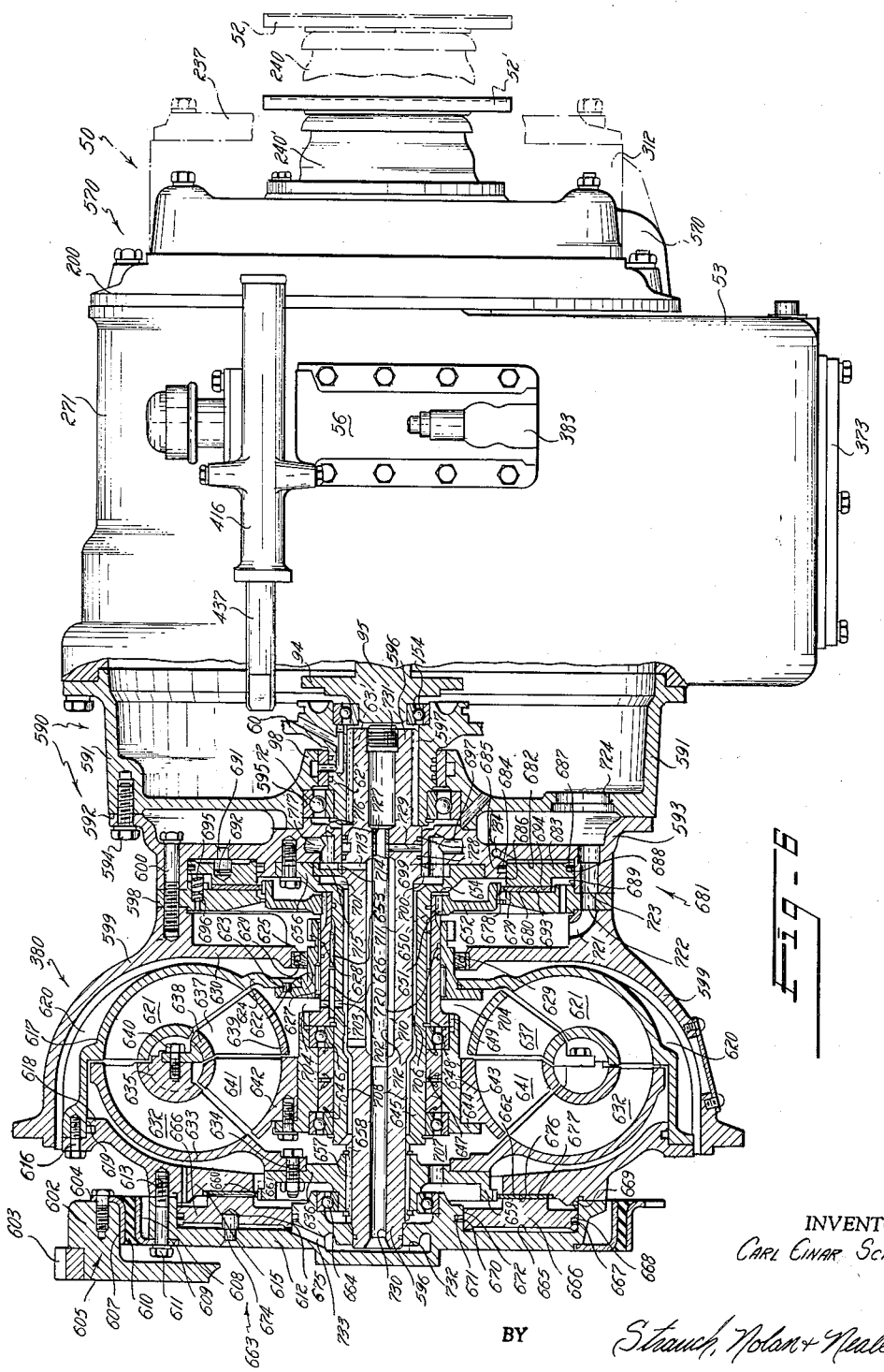

March 6, 1962

C. E. SCHOU 3,023,640

DRIVE MECHANISM

Filed March 9, 1956

INVENTOR
Carl Einar Schou

BY Strauch, Nolan & Neale

ATTORNEYS

March 6, 1962 C. E. SCHOU 3,023,640
DRIVE MECHANISM
Filed March 9, 1956 22 Sheets-Sheet 10
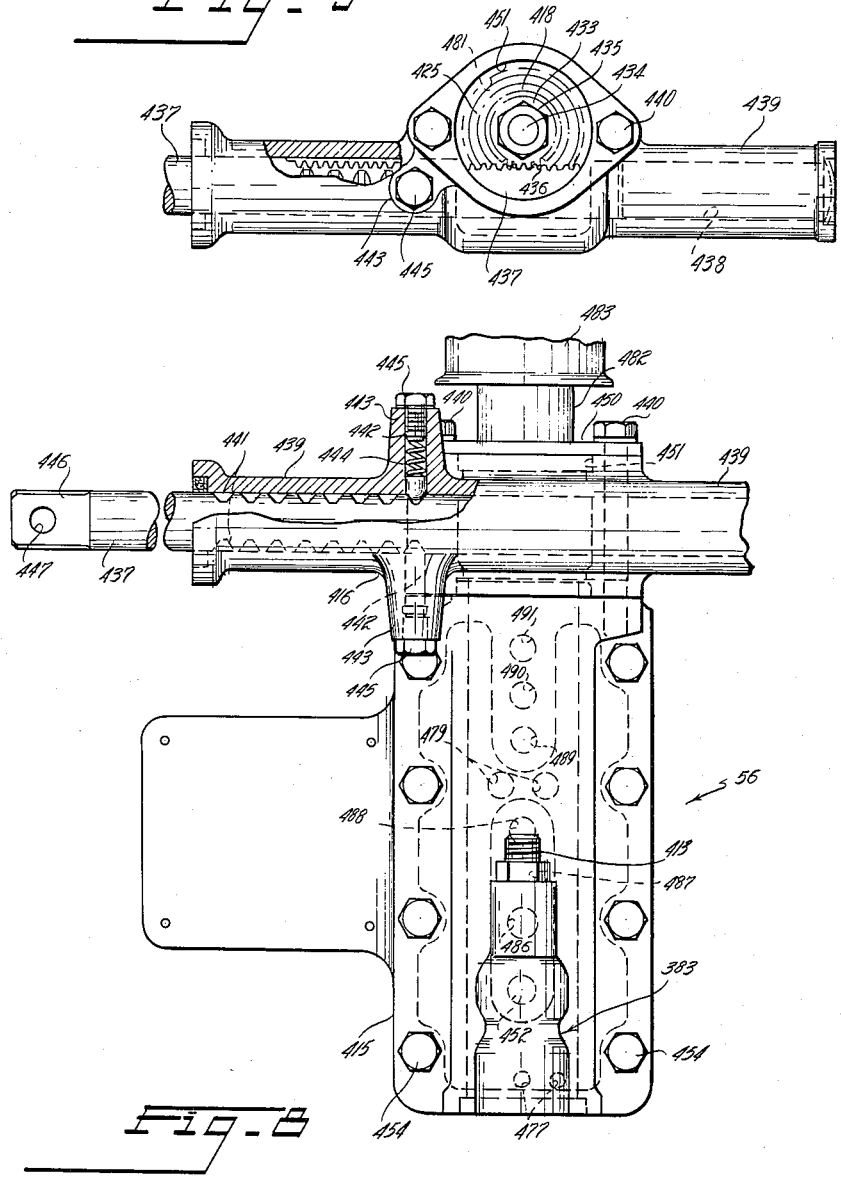
INVENTOR
Carl Einar Schou
BY
Strauch, Nolan & Neale
ATTORNEYS March 6, 1962 C. E. SCHOU 3,023,640
DRIVE MECHANISM
Filed March 9, 1956 22 Sheets-Sheet 11
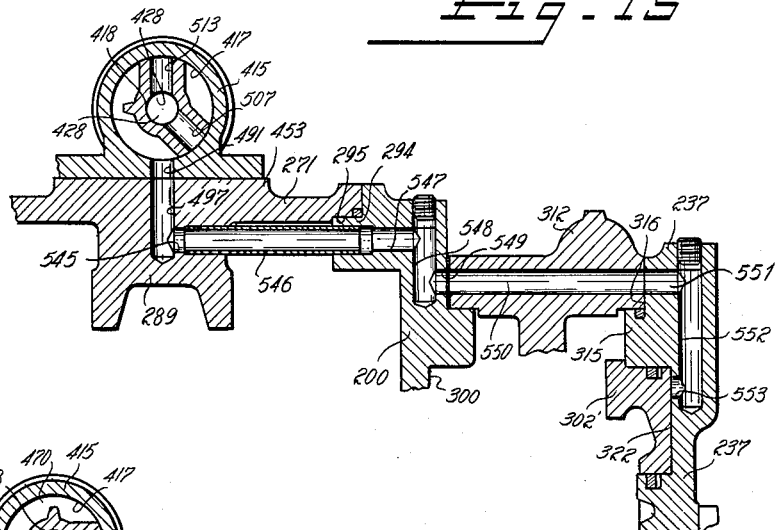
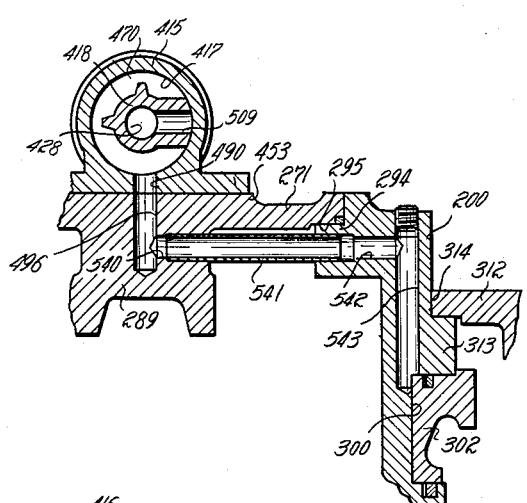
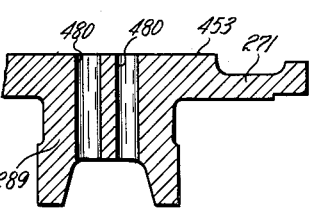
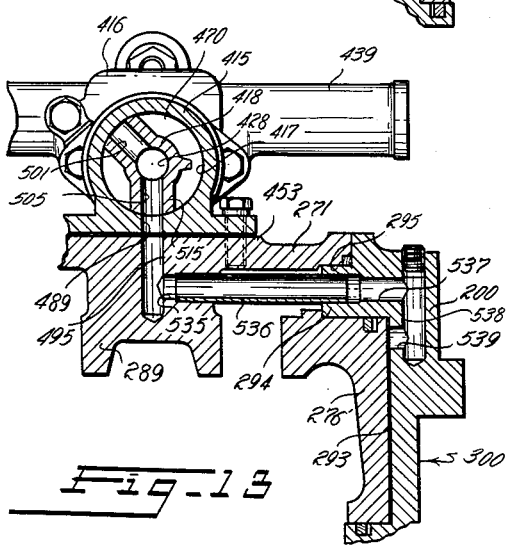
INVENTOR
CARL EINAR SCHOU
BY Strauch, Nolan & Neale
ATTORNEYS

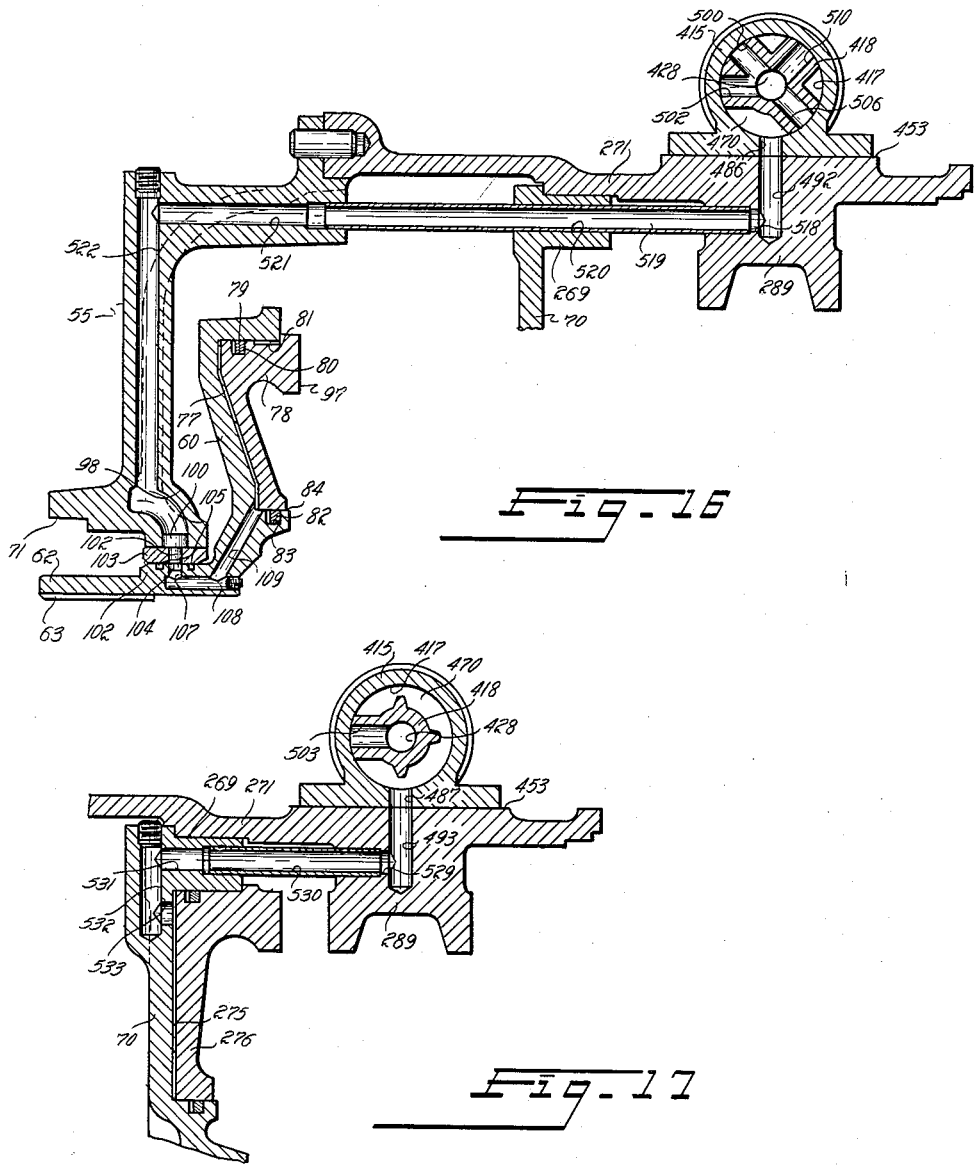

INVENTOR
CARL EINAR SCHOU

BY Strauch, Nolan & Neale

ATTORNEYS

March 6, 1962
C. E. SCHOU
3,023,640
DRIVE MECHANISM
Filed March 9, 1956
22 Sheets-Sheet 14
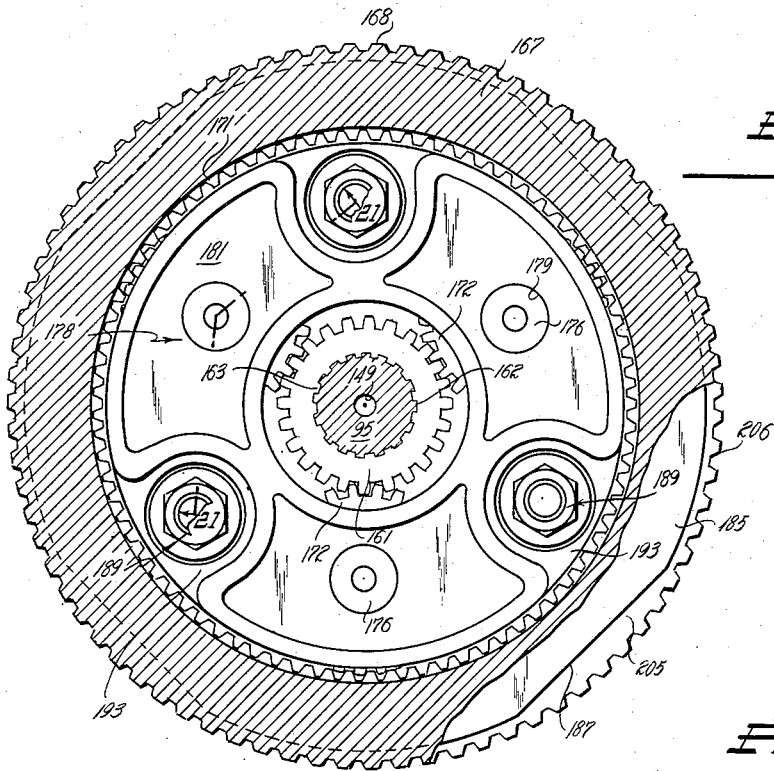
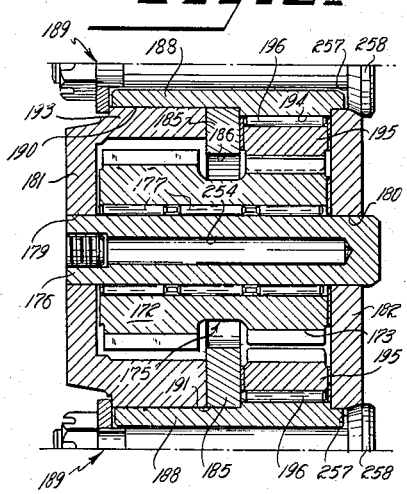
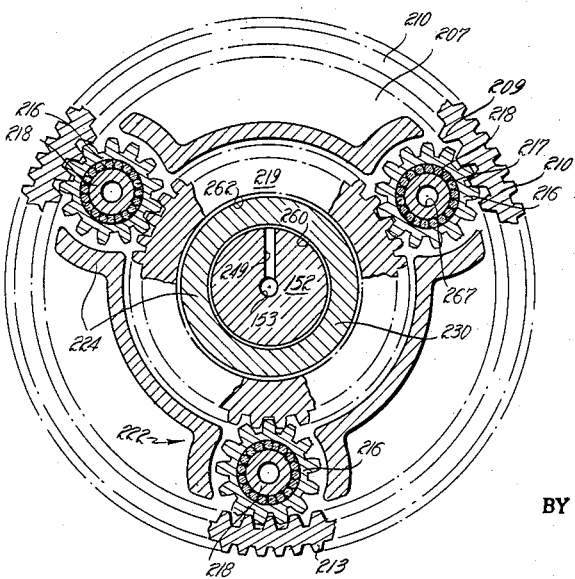
INVENTOR
CARL EINAR SCHOU
BY Staunch, Nolan & Neale
ATTORNEYS March 6, 1962

C. E. SCHOU 3,023,640

DRIVE MECHANISM

Filed March 9, 1956

INVENTOR
CARL EINAR SCHOU

ATTORNEYS

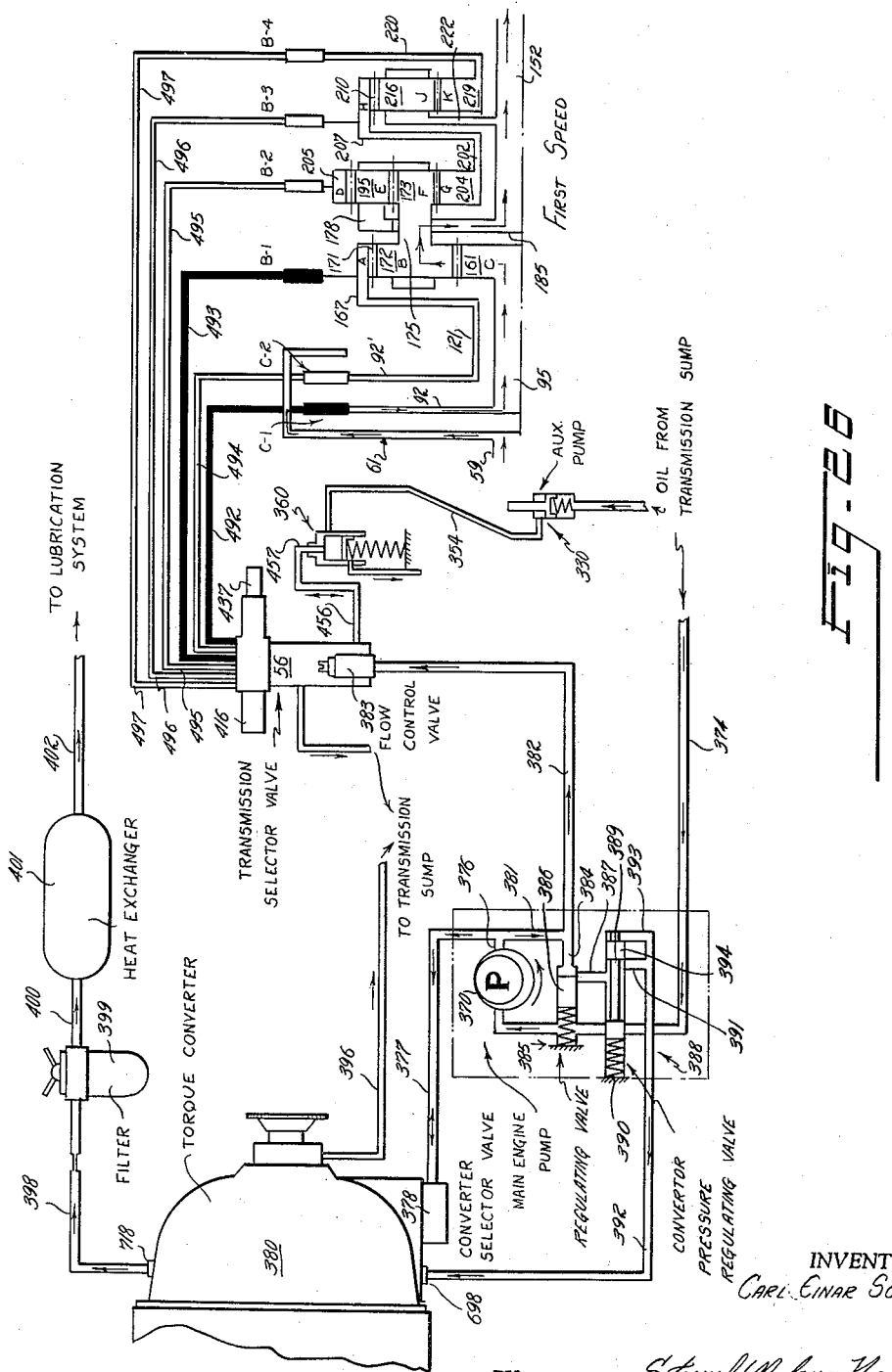

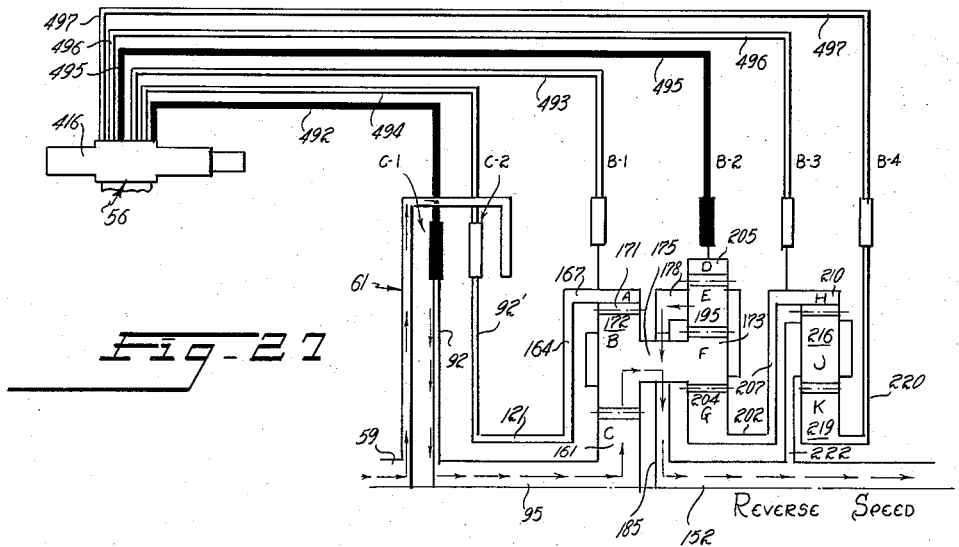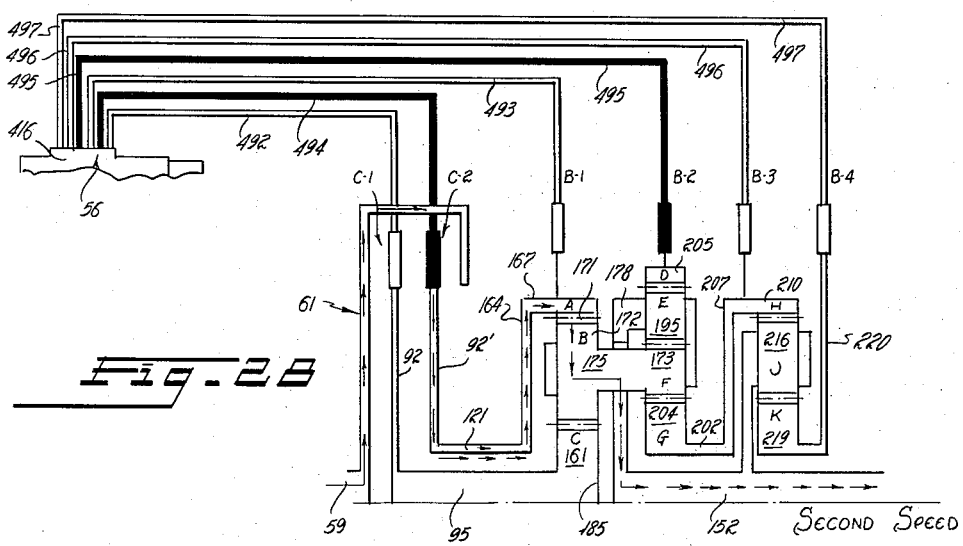

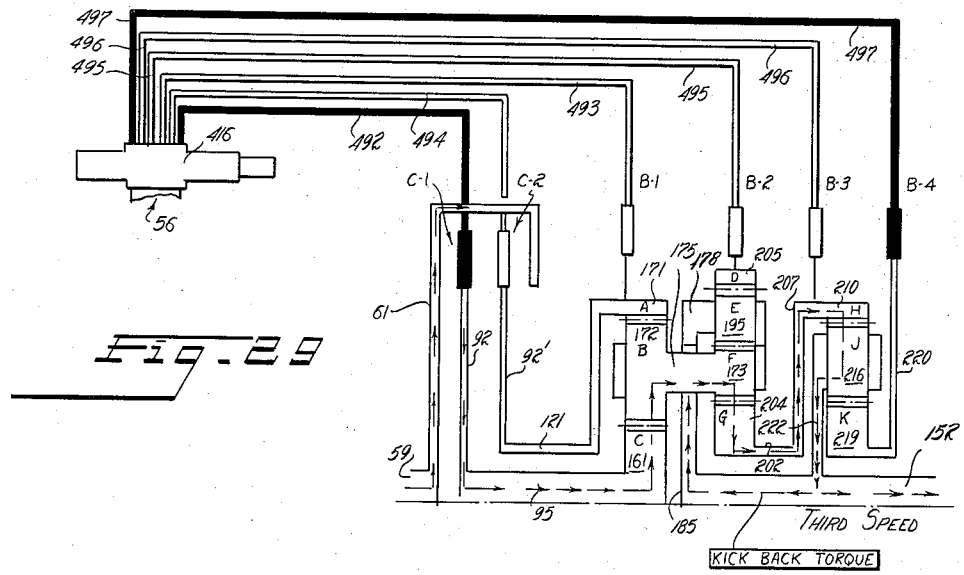
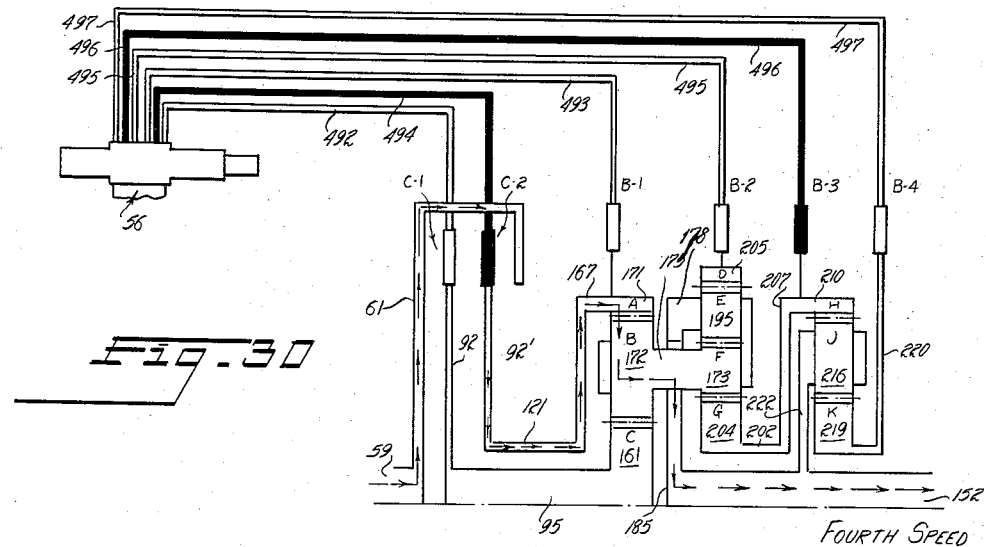

March 6, 1962 C. E. SCHOU 3,023,640
DRIVE MECHANISM
Filed March 9, 1956 22 Sheets-Sheet 19
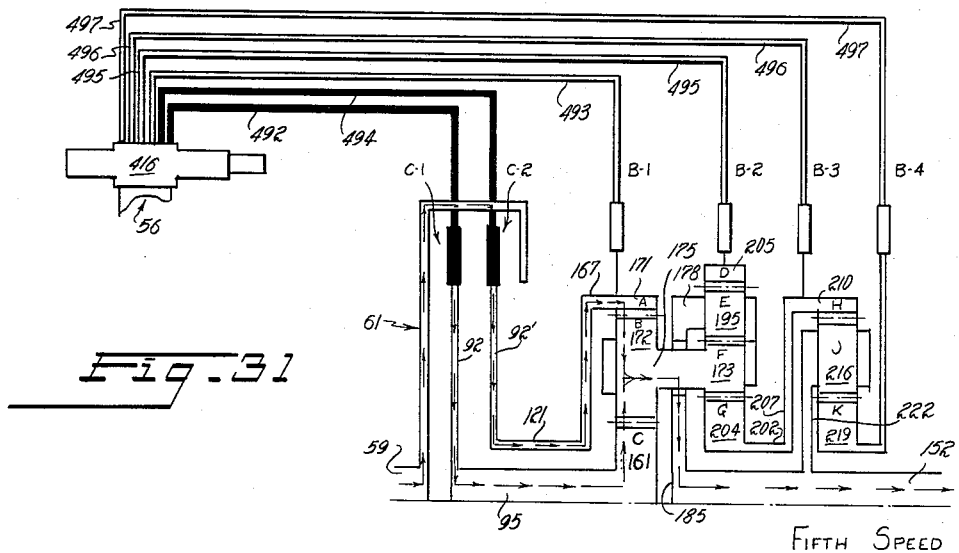
Fig. 31  FIFTH SPEED
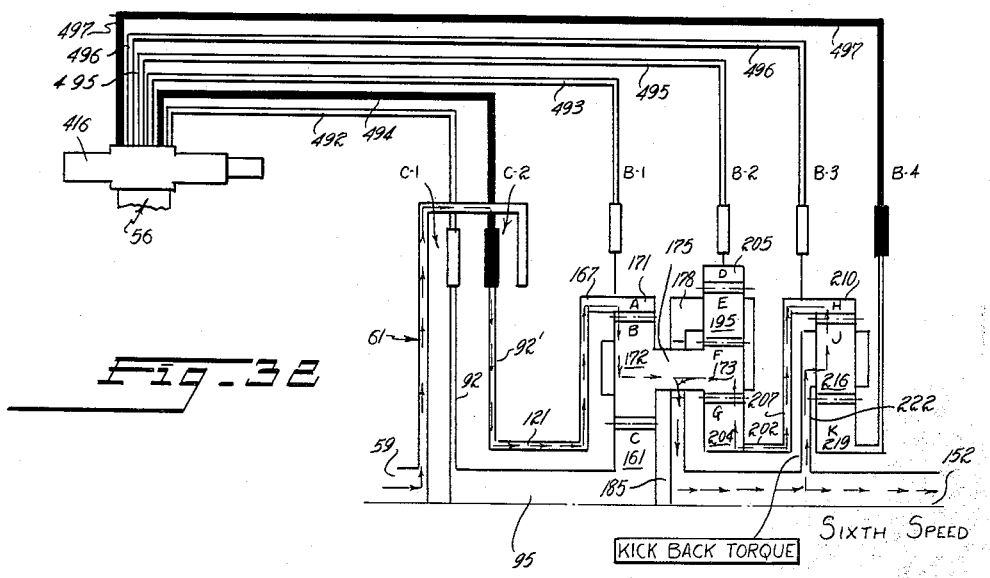
Fig. 32  SIXTH SPEED
KICK BACK TORQUE
INVENTOR
CARL EINAR SCHOU
BY Strauch, Nolan & Neale
ATTORNEYS March 6, 1962 C. E. SCHOU 3,023,640
DRIVE MECHANISM
Filed March 9, 1956 22 Sheets-Sheet 21

INVENTOR
CARL EINAR SCHOU

BY
ATTORNEYS

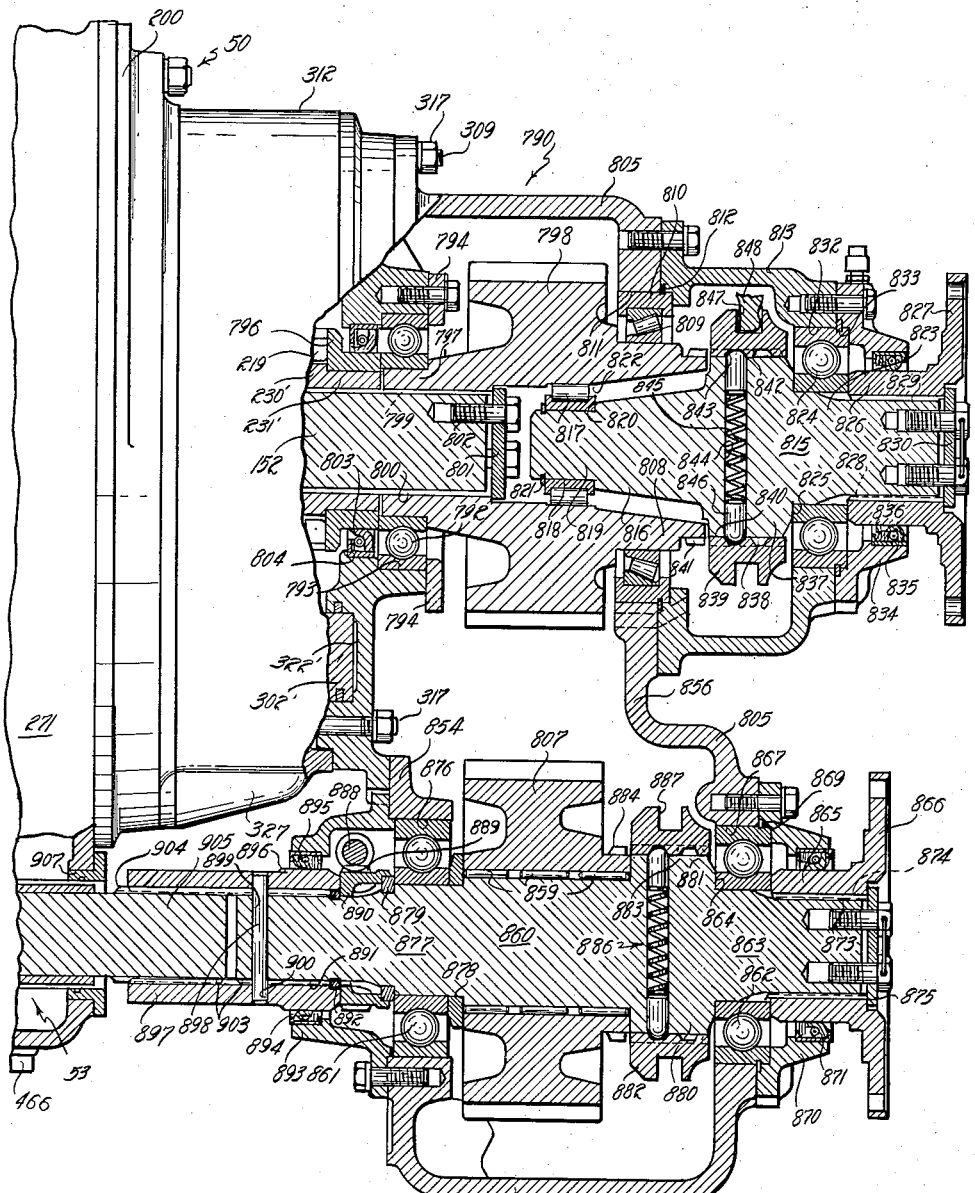

United States Patent Office 3,023,640
Patented Mar. 6, 1962

3,023,640
DRIVE MECHANISM
Carl E. Schou, Oshkosh, Wis., assignor to Rockwell-Standard Corporation, a corporation of Pennsylvania
Filed Mar. 9, 1956, Ser. No. 570,462
22 Claims. (Cl. 74—732)

This invention relates to improvements in drive mechanisms and particularly to semi-automatic multi-speed planetary transmission mechanisms.

Multi-speed planetary transmissions are known to prior art but such transmissions have not attained a desired dependability which, coupled with economic production factors, is wholly acceptable to industry. This invention, by reducing the number of mechanical elements and structurally interrelating the various components to enable rugged units to be assembled in a compact structure, provides a highly satisfactory transmission mechanism that is substantially foolproof and has versatility in adaptation to varied installations.

The invention is primarily directed to a transmission driven by a prime mover through an intermediate transmission such as a multi-stage hydraulic torque converter. The preferred form of the invention is a six-speed transmission having three planetary systems: two main planetaries in compound relation and a third small secondary planetary gear train. In a second form the transmission is a four-speed transmission using substantially the same components as the six-speed transmission except that it has been modified by removal of the third small planetary gear train, and by several other changes incident to removal of the planetary gear train. Either form of the novel transmission, the six and four-speed forms, may be supplied as independent units for use with or without an intermediate transmission such as a multistage hydraulic torque converter or as integral torque converter-transmission units.

A new transmission hydraulic selector valve is used for speed ratio control. The valve is more compact than previously used valves and by journalling the valve rotor in loose rollers as bearings, easier operation between and through speed ratio settings has been accomplished using a stationary valve housing. An additional aspect of this invention is the use of a novel auxiliary pump operated by the transmission output shaft. The pump is operated by a cam-like peripheral flange integral with the transmission output shaft which is also non-rotatably secured to the carrier systems of the first two compounded planetary systems. This auxiliary pump is automatically operable only when the vehicle is being pushed to be started, because when the main engine driven pump becomes operative, the relatively high main hydraulic line pressure created by the engine driven pump acts through special components of the transmission hydraulic system to retract the auxiliary pump plunger from engagement with the cam periphery of the transmission output shaft flange.

Accordingly, a primary object of this invention is to provide a novel semi-automatic multi-speed planetary transmission.

Another object resides in the provision of a novel six-speed transmission using three planetary systems, of which the first two are main planetary systems in compound relation and the third is a small secondary planetary gear train.

A further object resides in the provision of a novel four-speed transmission with two planetary systems in compound relation.

Still another object resides in the provision of a combination drive mechanism including a semi-automatic multi-speed planetary transmission with a prime mover driven multi-stage hydraulic torque converter connected to the multi-speed transmission input member.

A still further object resides in providing a novel semi-automatic multi-speed planetary transmission in which all planetary gear carriers are non-rotatably secured directly to the transmission output shaft.

Another object resides in the provision of a novel integral multi-stage hydraulic torque converter and semi-automatic multi-speed planetary transmission unit.

A still further object resides in the provision of a novel auxiliary pump which operates to supply a transmission hydraulic system with oil under pressure only when the prime mover and prime mover driven pump are not operating, a condition which exists when the vehicle must be pushed to be started.

Another object resides in providing a multi-stage hydraulic torque converter and the semi-automatic multi-speed transmission with a novel pump and a hydraulic system common to both the converter and the transmission. This eliminates an unnecessary duplication of hydraulic components, saving initial costs for parts and assembly and saving time and cost for servicing.

A further object resides in the provision of an oil pressure accumulator for the transmission hydraulic system incorporated in a novel manner in the transmission-sump together with a readily accessible vertically disposed compression coil spring for accumulator bias.

Still another object resides in providing a novel drive mechanism hydraulic system adjustment by using an adjustable needle valve interposed between a motor driven pump and a multi-speed transmission control valve in the hydraulic system.

A further object is to provide a short length plural stage torque converter, of the revolving housing type, which automatically transforms into a fluid coupling when the torque ratio approaches 1:1.

Another object is to provide a hydraulically actuated brake in novel relationship with a plural stage torque converter, to lock a normally overrunning torque converter guide ring or reactor blade ring to thereby utilize the torque converter as a dynamic brake.

Still another object resides in the provision of uniformity of similar components in a novel multi-stage planetary transmission.

A still further object is to provide a novel drive mechanism including a multi-speed transmission, suitable for four wheel drive application or for a power take-off absorbing the entire engine power, and including two declutching mechanisms allowing independent drive to either of the wheel drive or the power take-off.

Another object resides in the provision of a novel drop gear transfer case construction at the rear end of a multi-speed transmission, in which a lower transfer gear drive furnishes drive power for a vehicle and the upper transfer gear drive provides an extended through shaft power output for driving mechanisms such as concrete pumps. The added drop gear case construction can be used for 4 x 4 or 6 x 6 vehicle drives by providing a tunnel through the transmission sump for an extended front shaft for driving the front axle.

Further novel features and objects of the present invention will become apparent from the following detailed description and the appended claims taken in conjunction with the accompanying drawings, illustrating simple and practical embodiments thereof, in which:

FIGURE 1 is a side elevation of the six-speed transmission of the present invention with an attached transfer transmission in a drop gear case, including a tunnel through the six-speed transmission sump, the transfer transmission being illustrated in phantom lines so the six-speed transmission is clearly delineated;

FIGURE 2 is a front elevation view of the six-speed transmission of FIGURE 1, with the transfer lower drive shaft removed and with some of the hydraulic control conduits illustrated by dotted lines;

FIGURE 3 is a partially broken and sectioned rear view of the six-speed transmission of FIGURE 1, with the transfer-transmission omitted, illustrating details of the sump mounted accumulator;

Figure 37:
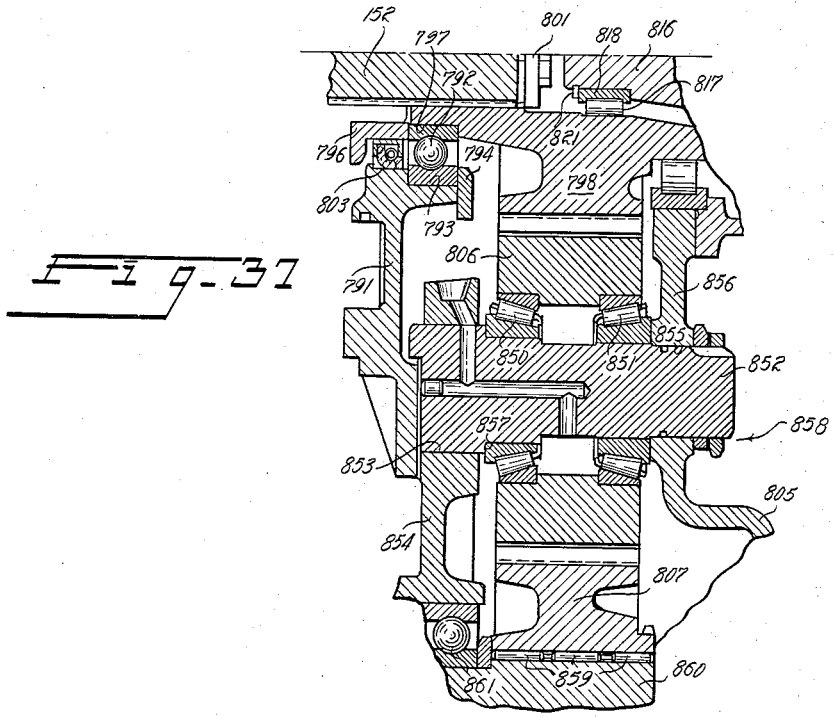
Figure 1A:
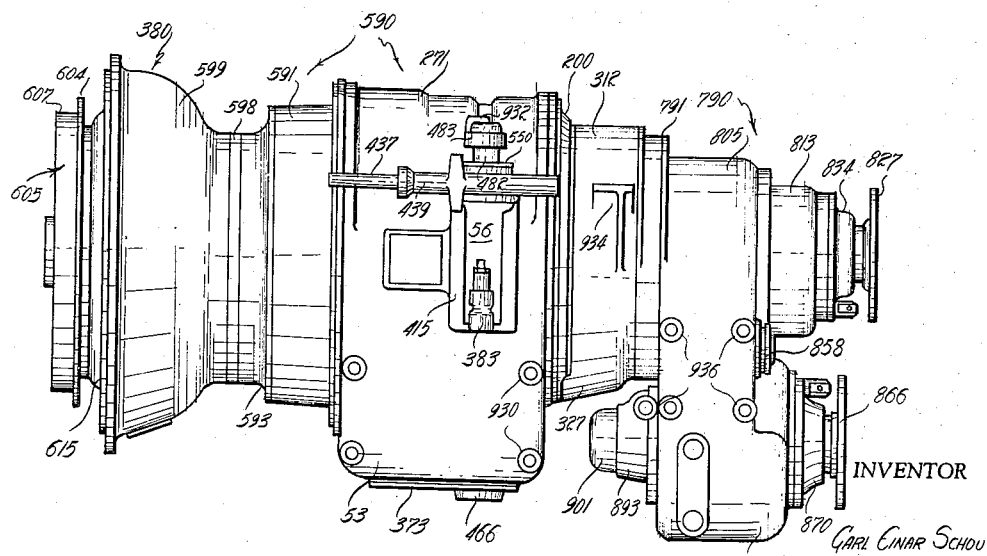
FIGURE 1A is a side elevation of a drive mechanism unit that includes, a torque converter, a six-speed transmission and a rear drop-gear transfer transmission having provision for front and rear axle drives.
Figure 7:
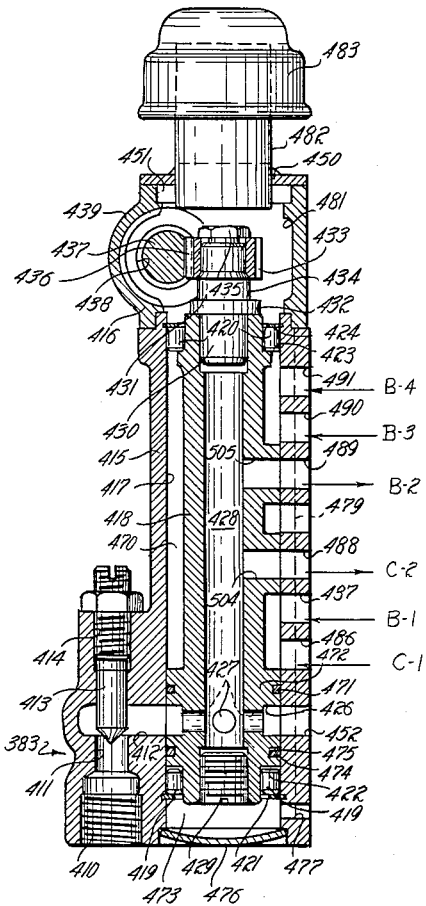
Figure 10:
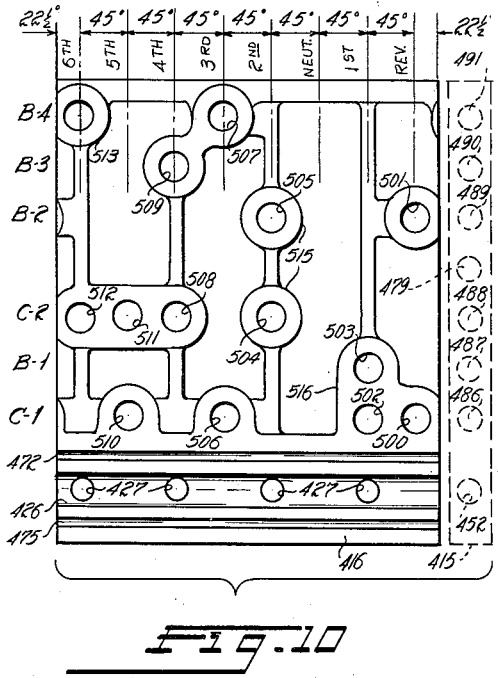
Figure 11:
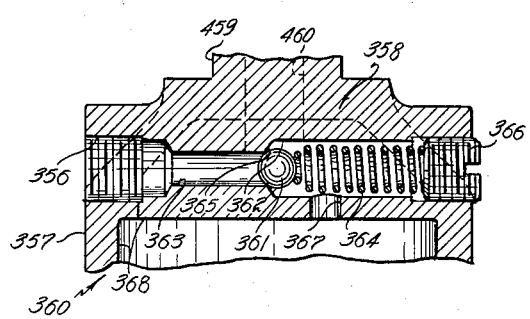
Figure 18:
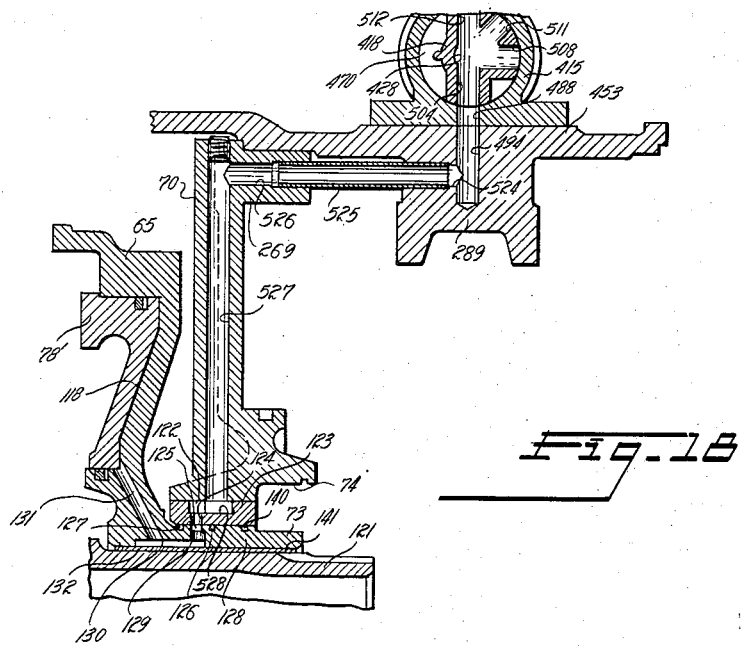
Figure 19:
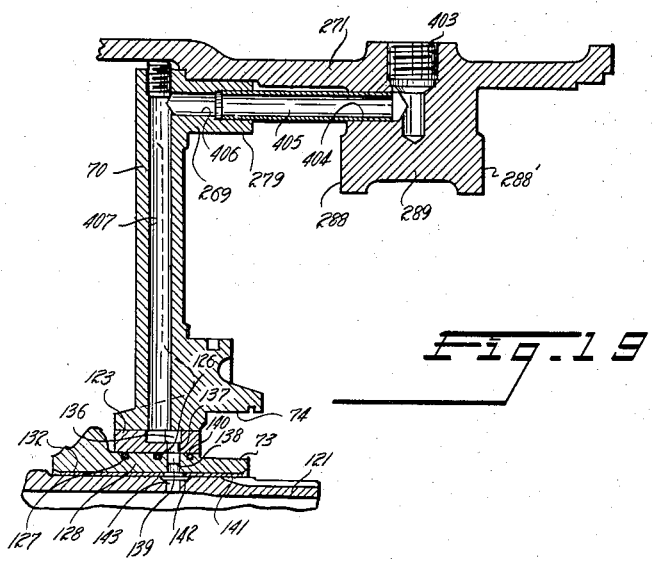
Figures 22, 23, 25:
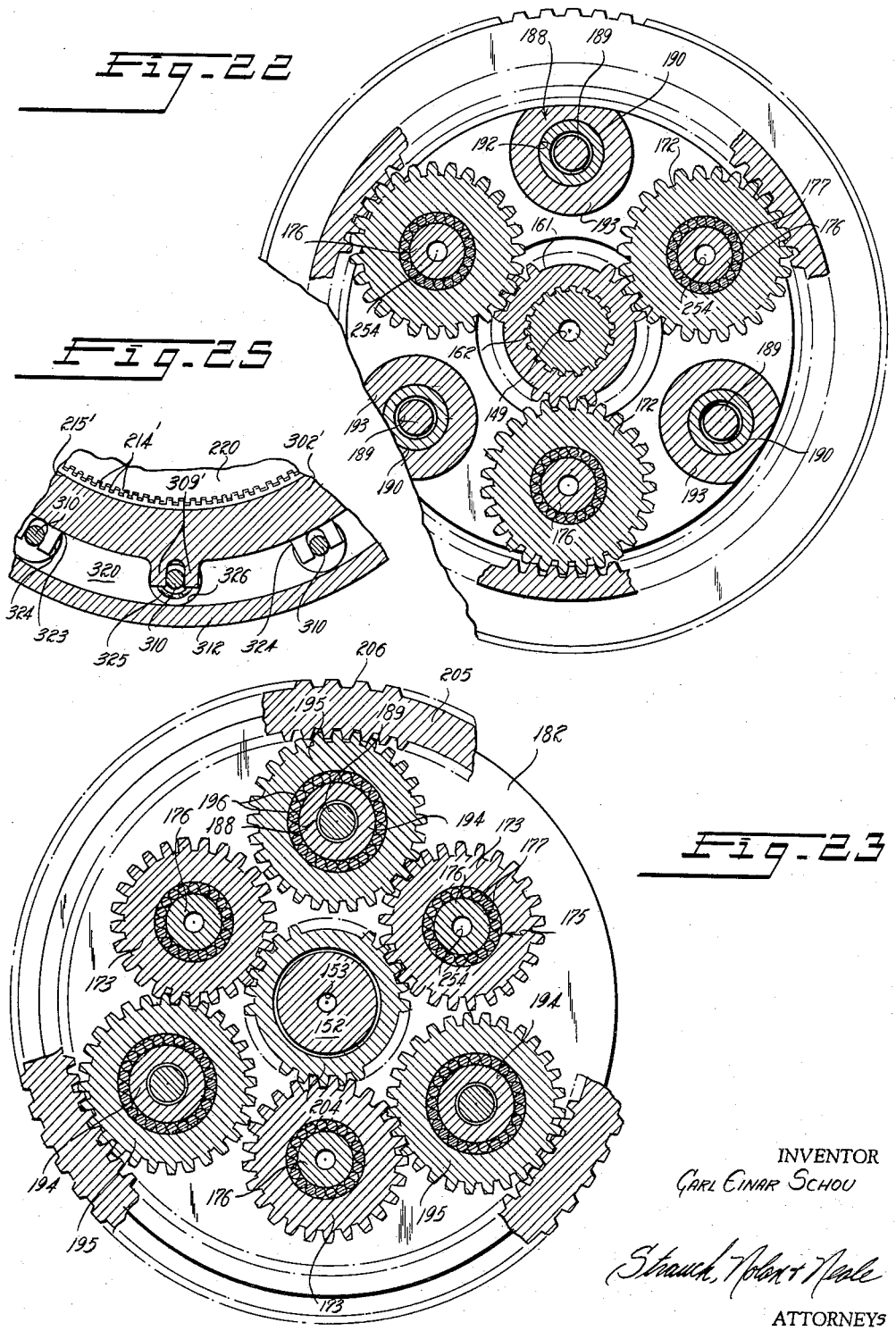
Figure 33:
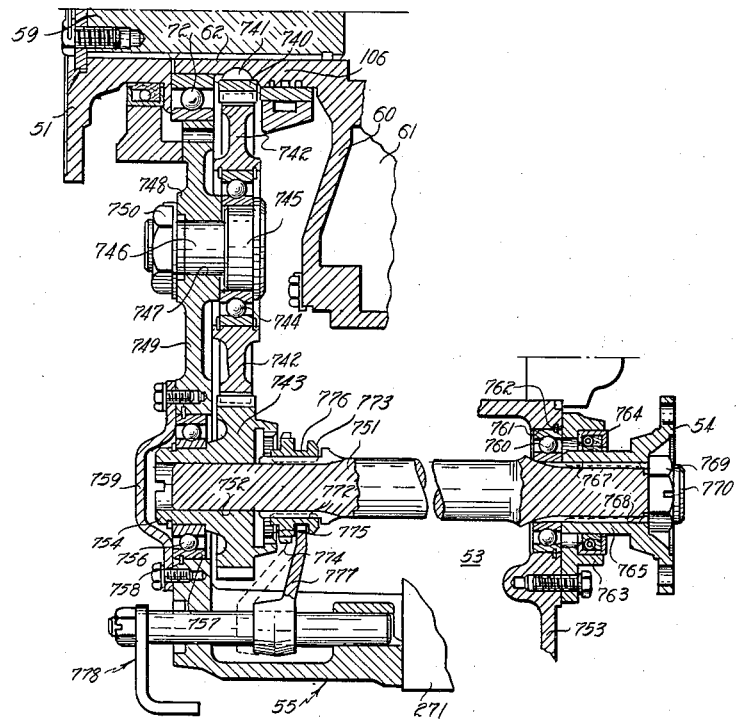
Figure 36:
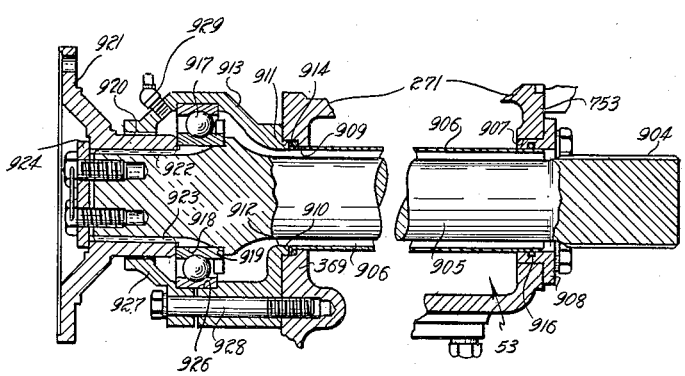
Figure 34:
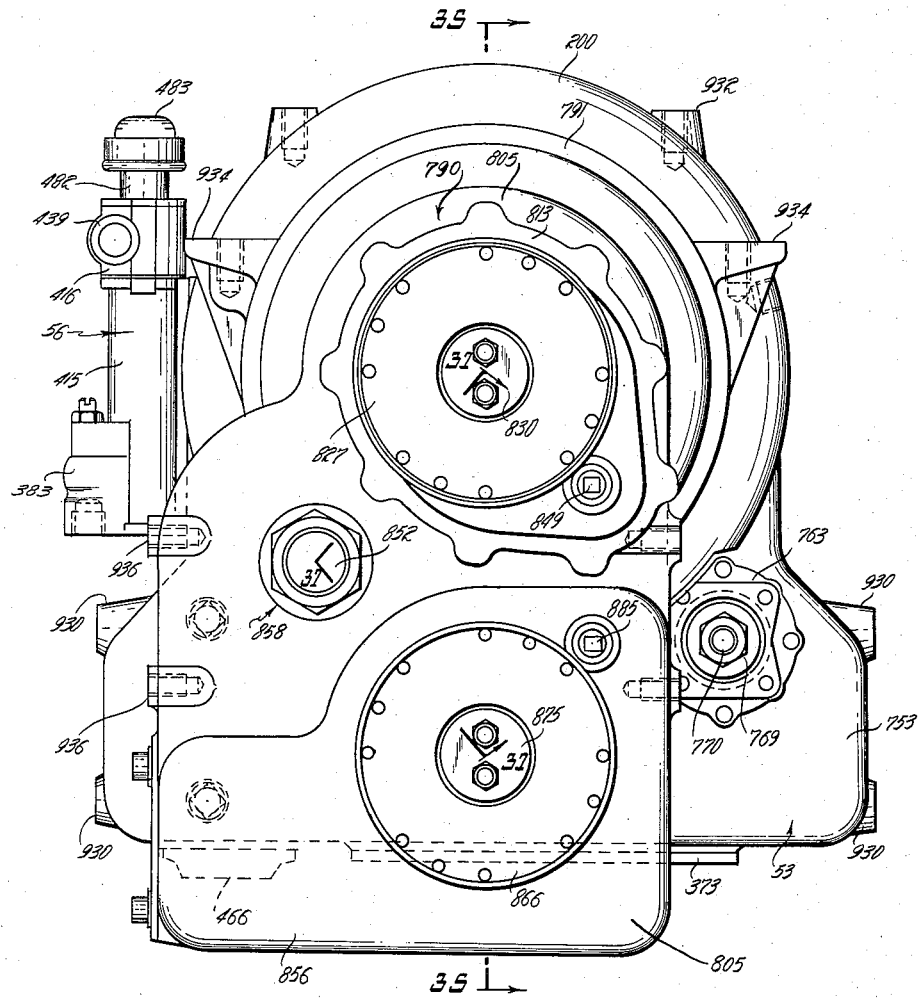

FIGURES 4 and 4A, when viewed together, constitute a sectioned side view of the six-speed semi-automatic transmission of FIGURE 1, with the auxiliary pump mechanism displaced from its actual location for clarity of disclosure;

FIGURE 5 is a side elevation view of a four-speed semi-automatic transmission partially sectioned to show its modifications from the six-speed transmission of FIGURE 4;

FIGURE 6 is a partially broken and sectioned side view illustrating the integral mounting of a two-stage hydraulic torque converter on the nose of either the four or six-speed semi-automatic transmissions;

FIGURE 7 is an enlarged rear, partially sectioned, view of the multi-speed transmission control valve;

FIGURE 8 is a view of the transmission hydraulic control valve, the ports through the mounting pad side being illustrated in dotted lines and the actuator housing being in partial section;

FIGURE 9 is a partially sectioned top plan view of the transmission hydraulic control valve with the breather cap omitted;

FIGURE 10 is a development of the valve core for the hydraulic control valve of FIGURES 7, 8 and 9 and a diagrammatic representation of the valve casing, illustrating the relationship of the core ports and valve ports;

FIGURE 11 is a section taken on line 11—11 of FIGURE 3, illustrating details of the ball check valve assembly in the accumulator housing;

FIGURE 12 is a section view taken along line 12—12 of FIGURE 3 showing selector valve drain openings through the transmission housings;

FIGURE 13 is a section view taken along line 13—13 of FIGURE 3 showing the fluid line construction of the brake (B–2) actuator of the second planetary system;

FIGURE 14 is a section view taken along line 14—14 of FIGURE 3 showing the fluid line construction for the front brake (B–3) actuator of the third planetary system which also brakes the ring gear of the second planetary system;

FIGURE 15 is a section view taken along line 15—15 of FIGURE 3 showing the fluid line construction for the rear brake (B–4) actuator of the third planetary system;

FIGURE 16 is a section view taken along line 16—16 of FIGURE 2 showing the fluid line construction for the front clutch (C–1) actuator in the multi-speed transmission;

FIGURE 17 is a section view taken along line 17—17 of FIGURE 2 showing the fluid line construction for the brake (B–1) actuator in the first planetary system;

FIGURE 18 is a section view taken along line 18—18 of FIGURE 2 showing the fluid line construction for the rear clutch (C–2) actuator in the multi-speed transmission;

FIGURE 19 is a section view taken along line 19—19 of FIGURE 2 showing lubrication line detail within the transmission;

FIGURE 20 is a partially broken section view taken on line 20—20 of FIGURE 4A showing details of the planetary carrier for the first and second planetaries and the auxiliary pump actuator flange on the transmission output shaft;

FIGURE 21 is a section view taken along line 21—21 of FIGURE 20, showing details of the compound planetary gears of the first and second planetary systems;

FIGURE 22 is a section view taken along line 22—22 of FIGURE 4A, illustrating the gear arrangement of the first planetary system;

FIGURE 23 is a section view taken along line 23—23 of FIGURE 4A, illustrating the gear arrangement of the second planetary system;

FIGURE 24 is a section view taken along line 24—24 of FIGURE 4A, illustrating the gear arrangement of the third planetary system;

FIGURE 25 is a section view taken along line 25—25 of FIGURE 4A, illustrating details of the forked projections on a brake (B–4) piston and fixed brake disc;

FIGURE 26 is a schematic layout of the hydraulic system and the six-speed semi-automatic transmission and diagrammatically illustrates the flow of power through the various gears when the transmission is in first speed;

FIGURE 27 is a schematic layout illustrating the control circuit from the hydraulic system selector valve to the six-speed transmission and diagrammatically illustrates the flow of power through the transmission when in reverse;

FIGURE 28 is a schematic layout similar to FIGURE 27, diagrammatically illustrating the flow of power through the transmission for second-speed;

FIGURE 29 is a schematic layout similar to FIGURE 27, diagrammatically illustrating the flow of power through the transmission for third-speed;

FIGURE 30 is a schematic layout similar to FIGURE 27, diagrammatically illustrating the flow of power through the transmission for fourth-speed;

FIGURE 31 is a schematic layout similar to FIGURE 27, diagrammatically illustrating the flow of power through the transmission for fifth-speed;

FIGURE 32 is a schematic layout similar to FIGURE 27, diagrammatically illustrating the flow of power through the transmission for sixth-speed;

FIGURE 33 is a section view taken substantially on line 33—33—33—33 of FIGURE 2 showing details of the power take-off arrangement for the six-speed transmission illustrated in FIGURES 4 and 4A;

FIGURE 34 is a rear view of the six-speed transmission including the transfer transmission as shown by phantom lines in FIGURE 1;

FIGURE 35 is a partially broken and sectioned view taken along line 35—35 of FIGURE 34, illustrating details of the transfer transmission;

FIGURE 36 is a section view illustrating provision for a front axle drive shaft which extends from the transfer transmission, of FIGURES 1 and 34, through a tunnel in the oil sump; and FIGURE 37 (on the sheet containing FIGURE 1A) is a section view taken along line 37—37—37 of FIGURE 34, illustrating details of the transfer transmission drop-gear mounting.

*Six-Speed Transmission*

One of the primary units of the drive mechanism is a six-speed semi-automatic transmission 50 which, with reference to the drawings and particularly to FIGURES 1, 2 and 3 will now be described in detail. The semi-automatic transmission 50 is equipped with a flanged input member 51, a flanged output member 52, an oil sump 53 and a flanged power take-off member 54. The front transmission housing 55 constitutes an enclosure for a power take-off gear assembly (to be described) for transferring power through various gears and shafts from the front of transmission to the flanged member 54. A hydraulic selector valve assembly 56, mounted on the side of transmission 50, is provided for control of transmission shift.

The flange input member 51 (FIGURES 4 and 4A) is formed with internal splines 57 that engage external splines 58 of a transmission input shaft 59. The front member 60 of a rotatable clutch case assembly 61 has a forwardly extended hub 62 with internal splines 63 engaged with the external splines 58 of input shaft 59. The clutch case assembly 61 includes the front member 60, a center clutch plate member 64 and a rear member 65 integrally fastened together as a unit by a plurality of circumferentially spaced bolts 68. As will be explained in detail hereinafter, the clutch case 61 contains clutching mechanism enabling input power to be selectively coupled to either one or both of two output drive paths to planetary gear systems. The clutch case 61 is supported within the transmission between front housing 55 and an intermediate housing partition 70 which serves as a brake actuator housing member, the front hub 62 of the clutch case assembly 61 projecting into and being journalled in an opening 71 of the front housing member 55 by a ball bearing 72 and a rear clutch case hub 73 projecting into and being journalled in an opening 74 of the intermediate partition 70 by a ball bearing 75.

Front member 60, of the clutch case 61, is provided with an internal annular cylinder chamber 77 containing an annular piston 78. The outer circumference of piston 78 includes an annular groove 79 carrying an oil ring 80 to limit loss of oil along the cylinder chamber outer wall 81. A second oil ring 82 is disposed in an annular groove 83 in the inner chamber wall 84 and limits the loss of oil between the inner wall and piston 78. One edge of the outer periphery of piston 78 is formed with radially outwardly extended forked projections 85 which engage alternate ones of bolts 68 and prevent relative rotation between the piston 78 and clutch case 61 while permitting axial movement of piston 78. The bolts 68, which hold the clutch case members 60, 64 and 65 in assembled relation, extend parallel to the clutch case axis through the front clutch case member 60, center clutch plate 64, and rear clutch case member 65.

Within clutch case 61, a driving clutch disc 87 is fixed against rotation relative to case 61 by forked projections 88 which engage the alternate ones of bolts 68 between those engaged by the forked piston projections 85. Driven clutch discs 89 have internal splines 90 engaged with external splines 91 on the outer circumferential flange of the output member 92 of the forward clutch C-1. Output member 92 is secured by rivets 93 to a flange 94 of an intermediate transmission shaft 95. Clutch disc 87 and clutch discs 89 are tightly pressed between a clutch surface 96 of the axially fixed center clutch plate member 64 and a clutch surface 97 on piston 78, when the piston 78 is actuated, to establish a drive through the clutch C-1.

To engage the clutch C-1, hydraulic fluid (oil) under pressure is introduced into cylinder chamber 77 behind piston 78. As shown in FIGURES 4 and 16, the actuating oil is supplied to chamber 77 of clutch C-1 through a central annular housing 98, integrally fixed to the interior of front transmission housing 55, into an annular housing groove 100, and through an opening 102 radially provided in a commutator insert 103, into an annular groove 104 between two oil seal rings 105, disposed on either side of groove 104 in a commutator portion 106 of clutch case hub 62, through an aperture 107 in the bottom of groove 104, a lateral passage 108 and an inclined passage channel 109 in the front clutch member that opens into the cylinder chamber 77.

Front member 60 of the clutch case 61 is equipped with a ball dump valve assembly 110, in the control system circuit for clutch C-1 (FIGURE 4), located in the outer wall of chamber 77. A channel 111 communicates between the cylinder chamber 77 and the radially outer side of the valve assembly 110. Dump valve 110 consists of a ball 112 disposed within a valve chamber 113, the weight of ball 112 being greater than the weight of a theoretical column of oil having a cross section area equal to ball diameter and extending radially from the radial position of ball 112 to a radial position, relative to the hub axis, equivalent to that of the hub contained lateral passage 108. Valve chamber 113 is disposed radially, is closed at its outer end by a threaded insert 114 and is provided at its radially inward end with a drain opening 115. During operation of the prime mover which rotates the transmission input member 51, the input shaft 59 and the clutch case assembly 60, centrifugal force developed in the valve ball 112, due to the aforementioned relationship, is greater than centrifugal force developed by the static oil in opposition to the ball 112. Hence the centrifugal force of the valve ball 112 will override the counterforce of the oil and valve 110 will open, thereby permitting the oil to bleed out through drain 115. When clutch C-1 is actuated to an engaged position, input pressure of the supplied oil will add to the centrifugal force on the oil, between the lateral passage 108 in the clutch case hub 62 and the valve body 110, to overcome the centrifugal force developed by ball 112, thereby closing the valve 110 by seating ball 112 on the peripheral lip of drain opening 115.

A second clutch C-2 is also contained within the clutch case assembly 61 and includes the rear case member 65 which is provided with an annular cylinder chamber 118 similar to but facing in a direction opposite that of chamber 77 for the clutch C-1. The piston 78', clutch disc 87' and discs 89', plate surface 96', piston surface 97' and output plate member 92' of clutch C-2 are substantially the same as the corresponding members of clutch C-1. Compression coil springs 119 are disposed on alternate bolts 68 between the forked flange projections 85 and 85' of the two clutch pistons 78 and 78' and continually urge the pistons into their respective chamber cylinders 77 and 118 in which position the respective clutches C-1 and C-2 are deactivated. Clutch output plate member 92' is riveted to a flange 120 on a tubular intermediate transmission shaft 121 which is coaxially disposed on the aforementioned intermediate transmission shaft 95. Note that all clutch and brake pistons illustrated in FIGURES 4, 4A and 5 are shown deactivated in the upper part of the figures and activated in the lower part of the figures.

To engage clutch C-2, hydraulic fluid (oil) under pressure is supplied to chamber 118 behind the piston 78'. The fluid communicates to the clutch C-2 through the aforementioned partition member 70 (see FIGURE 18) to an annular groove 122 in a commutator insert 123, through an aperture 124 formed in the insert 123 to an annular groove 125 between oil seals 126 and 127 in a commutator portion 128 of the clutch case hub 73, thence through a radial opening 129 from the groove 125 to an inner annular recessed portion 130 in hub 73 and into an inclined passage 131 to the cylinder chamber 118. The inner annular recess 130 of hub 72, in cooperation with a journal bearing insert 132, between the clutch case hub 73 and the tubular intermediate transmission shaft 121, provides an annular chamber with the aforementioned opening 129 and the passage 131 communicating therewith. The clutch case rear member 65 is also equipped with a ball dump valve assembly 110' with an inlet channel 111' leading from the cylinder chamber 118 of clutch C-2 and with a drain opening 115'. This ball dump valve assembly 110' is substantially the same and functions in the same manner as ball dump valve assembly 110 of clutch C-1. Note that any oil draining through the dump valve drains 115 and 115' can pass through drilled passages 133 in the pistons 78 and 78', and find its out through the periphery of the clutch case assembly 61, which has spaced openings between the circumferentially spaced bolts 68, and into the transmission sump 53.

To lubricate the internal transmission shafts, lubricating oil is conveyed through the housing partition member 70 (FIGURE 19) to a second annular groove 136 and radial opening 137 in the commutator insert 123, thence to a second annular groove 138 and an opening 139 in the commutator portion 128 of clutch case hub 73 between oil seals 126 and 140. A second journal bearing insert 141 is axially spaced from journal bearing insert 132, leaving an annular channel between the clutch case hub 73 and shaft 121 in radial alignment with commutator opening 139 to permit oil flow to a second annular groove 142 in the tubular intermediate transmission shaft 121 and through a radial opening 143 in the shaft 121 to a space 144 (FIGURES 4 and 4A) between inner intermediate transmission shaft 95 and the concentric tubular outer intermediate shaft 121. Space 144 between the two shafts is sealed at each end by seal members 145 and 146 but oil can flow through a short channel 147 formed in the inner shaft 95 adjacent seal 146, into a radial passage 148 to a central passage 149 in the innermost intermediate shaft 95. Intermediate transmission shaft 95 has a short extension 150 at its right hand end which is coaxially rotatably disposed in the left hand end of a transmission output shaft 152 and the central oil passage 149 in shaft 95 opens, through the extension 150, directly into a coextensive central passage 153 in transmission output shaft 152. The path of lubricating oil through and from output shaft 152 to the planetary system and output shaft journals will be described hereinafter.

The forward end (left hand in FIGURE 4) of the intermediate transmission shaft 95 is supported by a ball bearing 154 seated in a counterbore 155 of the clutch case front member 60, which as described is supported by ball bearing 72 in the front transmission housing member 55.

*First and Second Compounded Planetary Systems*

The first planetary gear system 160 has a sun gear 161 non-rotatably fixed by splines 162 to the rear end of the inner intermediate shaft 95 (FIGURE 4A) and is axially maintained thereon by snap rings 163 and a ring gear drive plate 164 is non-rotatably fixed by splines 165 to the rear end of the tubular intermediate shaft 121. Fixed to the outer periphery of drive plate 164 by locked splines 166 is a ring gear member 167 for the first planetary system. The outer circumferential periphery of ring gear member 167 is provided with splines 168 which are engaged by inner peripheral splines 169 of a plurality of brake discs 170 which are part of the brake assembly of the first planetary system brake B-1. Ring gear portion 171 of ring gear member 167 and the sun gear 161 are in meshed engagement with planet pinion gears 172, and each pinion gear 172 is integral and coaxial with a planet pinion gear 173 of the second planetary gear system 174. These integral units are designated as compound planet units 175, each unit 175 being rotatably mounted on a planet pinion shaft 176 by needle bearings 177 and each planet pinion shaft 176 being non-rotatably fixed in a planet carrier assembly 178 as by a press fit in carrier end plate openings 179 and 180.

The planet carrier assembly 178 has two parallel spaced end plates 181 and 182 and is non-rotatably secured on an annular radial flange 185 which is an integral part of the transmission output shaft 152. Flange 185 serves a twofold purpose, first as the compound planet carrier mount and second as an auxiliary pump operator. The flange 185 is provided with openings 186 which will admit passage of a gear 173 of a respective planet pinion unit 175 upon assembly, and the periphery of the flange is formed with cam flats 187 (FIGURE 20) for auxiliary pump operation, to be later described. With reference to FIGURES 20-24 for details, the carrier end plates 181 and 182 are maintained in assembly and secured on the output shaft flange 185 by hollow trunnions 188 and bolt assemblies 189. The left hand reduced shank portion 190 (FIGURE 4A) of each trunnion 188 extends through a hole 191 in flange 185 and into an aligned opening 192 in a spacing boss 193 formed on the end plate 181. Each trunnion 188 has enlarged journal portion 194 which is clamped between and maintains the spacing between the end plate 182 and the output shaft flange 185, and a planetary pinion gear 195 of the second planetary system 174 is rotatably mounted by needle bearings 196 on each of the trunnion portions 194. Carrier end plate 182 has a rearwardly extending central hub 197, rotatably supported by a ball bearing 198 disposed in a central opening 199 of a rear housing partition member 200. Radial journalling and end thrust support is provided between the end of carrier plate hub 197 and the sun gear member 202 of the second planetary system by a flanged journal bearing 203.

Sun gear member 202 of the second planetary system 174 is essentially tubular and has its forward end formed as a sun gear 204 which meshes with the aforementioned planetary pinion gears 173 of the compound planet gear units 175. Planet unit shafts 176 are so located in the carrier assembly 178 with respect to trunnions 188 that each planetary pinion gear 173 also meshes with an associated one of the second planetary system planet pinion gears 195. All planet pinion gears 195 are in meshed engagement with a second planetary system ring gear 205 having external splines 206 engaging internal splines 169' of brake discs 170' in the second planetary system brake B-2. Brake discs 170 and 170' of the brakes B-1 and B-2 are similar.

*Third Planetary System*

The rear end of the second planetary system's tubular sun gear member 202 has an integral radial flange 207 with peripheral splines 208 engaged and locked to the teeth of an internal ring gear 209 formed on a ring gear member 210 of the third planetary gear system 212. Ring gear member 210 has external splines 213 engaging internal splines 214 of a brake disc 215 in the forward brake B-3 for the third planetary system 212. Ring gear 209 of gear member 210 meshes with planet pinion gears 216 which are rotatably mounted by needle bearings 217 on planet gear shafts 218. All of the third planetary system planet pinion gears 216 also mesh with a ring type sun gear 219, an extended end of which is non-rotatably splined through its gear teeth to internal splines on a plate member 220. Plate 220 has a peripheral, axially disposed, splined flange 221 engaging internal splines on brake discs 215' in the rear brake B-4 of the third planetary system 212. The B-4 brake discs 215' are substantially the same as, and are interchangeable with, brake disc 215 in brake B-3 and with clutch discs 89 and 89' in the clutches C-1 and C-2.

Planet pinion gears 216 of the third planetary gear system 212 are mounted on a carrier assembly 222 which includes a supporting member 224 provided with circumferentially spaced radially disposed openings 225 receiving the planet gears 216. Openings 225 have front and rear side walls 226 and 227 with aligned axially directed holes 228 and 229 through which the planet pinion shafts 218 are press fit. Carrier support member 224 has a central hub 230 that extends rearwardly from wall 226 and terminates as a sleeve extension 231 which has internal splines 232 engaged with external splines 233 on the output transmission shaft 152. Support is provided for the carrier support member 224 and the transmission output shaft 152 by a ball bearing 235 with its inner race on the sleeved extension 231 of carrier hub 230 and with its outer race disposed in opening 236 provided in a rear transmission housing member 237. The bearing 235 is retained in opening 236 by a lock ring 238. Radial journalling and end thrust support is provided between carrier hub 230 and sun gear 219 by a flanged bearing 239 disposed on the hub extension 231. A transmission rear end apertured cap 240 is fastened to the rear transmission housing member 237 by bolts 241 and supports an oil seal 242 around the hub 243 of the flanged output member 52 which is bolted to and has internal splines 244 engaged with the splines 233 at the end of the transmission output shaft 152. End cap 240 also encloses a speedometer take-off member 245 which engages and is driven by a gear 246 integrally formed on the front end of the output member hub 243.

The foregoing description explained how lubricating oil can flow to a central passage 153 in the transmission output shaft 152. From the output shaft passage 153, oil can flow through two radial passages, 248 and 249. Oil flowing through passage 248 will enter a space between shaft 152 and the second planetary system sun gear member 202, thence through a radial passage 250 in member 202 to a space 251 for lubricating the journal bearing 203. Oil also flows from space 251 through inclined passages 252 in the carrier end plate 182 to radial passages 253 in planet pinion gear shafts 176 and through pinion gear shaft central passages 254 which direct the flow of oil to radial shaft openings 255 for lubricating the planet gear needle bearings 177. Oil also flows from space 251 through additional inclined passages 256 in the carrier end plate 182 to a space 257 beneath the head 258 of each carrier bolt assembly 189 and through the center of and out radial passages 259 in each tubular carrier trunnion 188, for lubricating the planet pinion gear needle bearings 196. Oil flows through the second radial passage 249 in the transmission output shaft to a space 260 interior of carrier hub 230 and thence through a radial opening 261 in the carrier hub to a space 262 between the hub 230 and sun gear member 219. The oil then passes through a radial opening 263 in the sun gear member 219 from which it is thrown, during operation, to an internal annular groove 264 in the carrier assembly 222. Oil feeds from the internal groove 264 through radial passages 265 in carrier assembly 222 and into radial openings 266 and a central passage 267 in the planetary gear shafts 218, thence through radial openings to the planet pinion needle bearings 217.

Brake actuator housing partition member 70 is axially maintained in assembly by an annular axially disposed flange 269 fitted in an annular axially disposed recess 270 formed in the central transmission housing member 271 and a peripheral shoulder 272 of the partition 70 is maintained in abutment with a recessed shoulder 273 in the transmission housing member 271, by stud and nut assemblies 274. Partition member 70 is formed with an integral annular cylinder chamber 275 on its rearward side, which chamber contains an annular piston 276. An oil ring 277, in an annular groove 278 in the outer piston wall, limits loss of oil along the outer cylinder wall 279; and a second oil ring 280, in an annular groove 281 in the inner cylinder wall 282, limits loss of oil between piston 276 and the inner wall 282. The periphery of piston 276 is formed with integral outwardly extended forked projections 283 that engage alternate ones of studs 274 to prevent relative rotation between the piston and housing partition member 70, at the same time permitting axial movement of piston 276. The stationary brake discs 286 of brake B-1 are rotationally fixed by integral forked projections 287 that engage the studs 274 between those alternate studs 274 that are engaged by the piston projections 283. This relationship is similar to that shown in FIGURE 25 for brake B-4. Brake discs 170 and 286 are pressed tightly together between a brake surface 288 on an annular inwardly extended housing boss 289, which is integral with the central transmission housing 271, and an opposed brake surface 290 on piston 276, when the piston 276 is actuated by oil pressure, to rotationally fix the ring gear member 167 of the first planetary gear system 160. Compression coil springs 291 are disposed on alternate ones of the studs 274 between the side wall of the inner annular housing boss 289 and the aforementioned forked projections 283 of piston 276 to continually urge piston 276 into the cylindrical chamber 275, i.e., toward a deactivated condition of brake B-1.

The second planetary system brake B-2 includes the rear housing partition member 200 which is provided with an annular cylinder chamber 293 on its forward side similar to and faced in the opposite direction from the chamber 275 of brake B-1. Housing member 200 serves as a portion of the transmission housing and is secured in axial position with an integral axially disposed annular flange 294 fitting in an axially disposed annular recess 295 of transmission body housing member 271, with a peripheral shoulder 296 in abutment with the housing end shoulder 297, by the aforementioned stud and nut assemblies 274. A seal ring is carried in an annular groove 298 formed in the partition flange 294. The piston 276', brake discs 170' and 286' and brake surfaces 288' and 290' are substantially the same as the corresponding members of brake B-1. Compression coil springs 299 are disposed on alternate studs 274 between the rear wall of annular housing boss 289 and the forked flange projections 283' on piston 276', to continually urge piston 276' into the cylinder chamber 293, i.e., toward the deactivated condition of brake B-2. Brake discs 170' and 286' are pressed tightly together between brake surfaces 288' and 290', when piston 276' is actuated by oil pressure, to rotationally fix the ring gear 205 of the second planetary gear system 174.

The third brake B-3 also includes the rear housing partition member 200, which has a cylinder chamber 300 formed in its rear face and which contains an annular piston 302 for the brake B-3. An oil ring 303 retained in an annular piston groove 304 limits loss of oil along cylinder chamber wall 305; and a second oil ring 306, in an annular groove 307 in the inner cylinder wall 308, limits loss of oil between piston 302 and wall 308. Piston 302 is formed with peripherally outwardly extended forked projections 309 which engage alternate ones of a plurality of circumferentially spaced studs 310, fastened in the partition member 200, to prevent relative rotation between piston 302 and housing partition member 200, at the same time permitting axial movement of piston 302.

A rear short substantially cylindrical housing member 312 is axially and radially positioned by cooperation with an annular wall flange 313 and shoulder 314 of the rear partition member 200, and similarly cooperates with an annular flange 315 and shoulder 316 on the rear transmission housing member 237, the rear member 237 and cylindrical member 312 being secured to the partition member 200 by nuts 317 on the aforementioned studs 310. When the brake B-3 is actuated, the brake disc 215 is compressed tightly between a braking surface 318 of the piston 302 and a braking surface 319 on an annular inwardly extended boss 320 of housing member 312, to rotationally fix the ring gear member 210 of the third planetary gear system 212 and also the sun gear 204 of the second planetary gear system 174 which is nonrotatably secured to ring gear member 210. Note that alternate studs 310 pass through holes 321 in the annular boss 320 of circumferential housing 312 to thereby positively prevent any rotation of the boss 320 when braking occurs.

The fourth brake B-4 (rear brake in the third planetary system) includes the transmission housing rear member 237 which is provided with an annular cylinder chamber 322 which is similar to but faced in the opposite direction from chamber 300 of the brake B-3. The annular piston 302', brake discs 215' and brake surfaces 318' and 319' are substantially the same as the corresponding members of brake B-3. Brake assembly B-4 includes a fixed brake disc 323 (see FIGURE 25 for details) with forked projections 324 that engage the alternate ones of studs 310 between the studs 310 which are engaged by the projections 309 and 309' of pistons 302 and 302'. Brake discs 215, 215' and 323 are substantially the same as, and are interchangeable with, respective clutch discs 89, 89' and 87, 87'. Compression coil springs 325 are disposed on alternate studs 310 between the forked projections 309 and 309' of respective pistons 302 and 302' to continually urge the pistons 302 and 302' into their respective cylinder chambers 300 and 322, i.e., toward the deactivated condition for both brakes B-3 and B-4. Coil springs 325 are disposed through holes 326 in the inner annular boss 320 and such holes are larger than the alternate stud holes 321. Brake discs 215' and 323 are pressed tightly between braking surfaces 318' and 319' when the piston 302' is actuated by oil under pressure, to rotationally fix flanged plate 220, which, being splined to sun gear 219 of the third planetary system 212, rotationally fixes that sun gear.

Cylindrical housing member 312 is provided with an oil channel boss 327 at the bottom with passages to direct draining oil toward the transmission oil sump 43.

Auxiliary Pump and Accumulator

An auxiliary pump assembly 330, briefly referred to in the foregoing description of the transmission output shaft flange plate 185, extends into the transmission oil sump 53 and has a stationary body 331 secured to a mounting pad 332 on the lower wall of housing member 271, within the sump 53, by bolts. The pump body 331 has a cylindrical recess 333 extending upwardly and terminating at a body end wall 334 having a central aperture 335, and the end wall being disposed against the mounting pad 332. A piston 336, fastened to an actuating rod 337 extending through aperture 335 and through a rod housing extension 338, is slidably disposed in the cylindrical pump body recess 333. Rod 337 is aligned with the output shaft flange plate 185 and has a cam follower end 339 that can engage the circumferential periphery of flange plate 185 under certain predetermined conditions so the peripheral cam flat surfaces 187 can act on the rod 337 to cause piston reciprocation. The piston 336 is continually urged upward to place the cam follower end 339 against the periphery of flange plate 185 by a compression coil spring 340 which is held in the lower end of cylindrical pump body recess 333 by a spring retainer cup 341. The upper end of spring 340 is seated in a counterbore 342 formed in the bottom face of piston 336. The spring retainer cup 341 has an aperture 343 through its bottom wall and a radial flange 344 formed around its upper open end, the flange cooperating with and retaining the retainer 341 in position in the pump body by abutment with an internal snap ring 345 disposed in an annular groove provided at the lower end of the valve body cylindrical recess 333.

A ball check valve 348 is provided in the piston 336 and is so arranged to open and admit oil to upper cylinder chamber 349 of the pump during a down-stroke of piston 336 and to close during an up-stroke of the piston. Valve 348 will close when its ball 350 seats on the upper peripheral edge of the opening through a valve bushing insert 351.

An oil line fixture 352 is threaded into an outlet opening 353 in the pump body 331 and is connected to an oil line 354. Oil line 354 passes across the sump 53 and connects with a fixture 355 threaded into a side opening 356 in the upper part of an oil accumulator housing 357 (see FIGURE 3).

Shown in detail in FIGURE 11, the upper end of accumulator housing 357 contains a ball type limited check valve 358 arranged to limit oil flow back from the accumulator assembly 360 through the oil line 354 to the auxiliary pump assembly 330. The valve ball 361 is disposed in a counterbore 362, in an integral part of the accumulator housing 357, that is coextensive with a passage 363 communicating with the side housing opening 356 and the ball is resiliently urged by a coil spring 364, also disposed in the counterbore 362, to seat against the peripheral edge 365 of passage 363. A threaded plug 366 in counterbore 362 provides a compression adjustment for spring 364. A radially disposed opening 367 in the wall of valve 358 provides fluid communication between the counterbore 362 and an upper cylindrical chamber 368 in the accumulator housing 357. Valve 358 is prearranged and preadjusted to permit sufficient flow-back of oil to the auxiliary pump 330 to force the auxiliary pump piston 336 downwardly against spring 340 to deactivate the auxiliary pump whenever the primary hydraulic system, which will be described hereinafter, furnishes a sufficiently high oil pressure to operate the transmission.

In operation, whenever fluid pressure in the auxiliary pump cylinder chamber 349 is such that downward force exerted by the fluid piston 336 equals or exceeds the upward force exerted by spring 340, piston 336 will be held in place or moved downward until limited by abutment with the flange 344 or spring retainer 341. This action will prevent the pump actuating rod 337 from engaging and following the cam flat surfaces 187 spaced around the periphery of transmission output shaft flange 185. In other words, the auxiliary pump 330 will operate to pick up oil from sump 53 and supply the transmission hydraulic system with oil under pressure only when the vehicle engine and the main engine driven pump for the hydraulic system (as described hereinafter) are not operating and if the vehicle is being pushed to be started, thereby causing the output shaft 152 of the transmission to rotate.

Hydraulic System

With reference to FIGURE 26 the hydraulic system functions with a single supply of oil, carried in the transmission sump 53, which furnishes fluid for the control systems of both the multi-speed transmission and the converter when one is used, the converter operating fluid and the drive mechanism lubrication system. Two oil pumps, the auxiliary pump 330 and a main hydraulic system engine driven pump 370 are included in this system. A tubular screen (not shown in detail) is mounted in the sump 53 by a screen mounting and outlet member 371 (see FIGURE 2) which is fastened to the front wall 369 of sump 53 by bolts. An access opening 372 is provided in the bottom of sump 53 and a bottom cover plate 373, fastened in place by bolts, closes the bottom of the sump. An oil suction line 374 (FIGURE 26) is threaded into a central opening 375 (FIGURE 2) in screen mounting member 371 and extends from the sump 53 to the inlet side of engine driven pump 370.

Oil flowing through line 374 to pump 370 is forced through pump outlet 376 at high pressure into a high pressure line 377 which extends and is connected to a converter selector valve 378 mounted on a torque converter 380. A high pressure branch line 381 is connected to and extends from pump outlet 376 to a pressure supply line 382 that is connected to a flow control valve 383 formed integral with the transmission selector valve 56 and a secondary branch line 384 leads from the pressure line 381 to a high pressure regulating valve 385. Valve 385 has a spring loaded piston plunger 386 which regulates the engine pump outlet oil pressure in lines 377, 381, 382 and 384 to approximately 185 pounds per square inch. Excess oil pressure moves the piston plunger 386 against spring bias to uncover an oil flow line 387 from regulator valve 385 to a converter pressure regulator valve 388 for regulating the charging pressure to torque converter 380 to approximately sixty pounds per square inch. Converter pressure regulating valve 388 is equipped with a compound piston plunger 389 which is shiftable against bias of spring 390 to throttle an outlet opening 391 and to also uncover an opening to the oil suction line 374 which permits excess converter charging oil to be by-passed to the pump inlet. This by-pass action occurs when oil pressure in the converter charging line 392 exceeds the maximum which would give a flow of approximately eighteen gallons per minute. The converter regulating valve branch lines 393, directly communicating with line 391, carries oil under the pressure existing in lines 391 to the head 394 of piston plunger 389 for opposing and overcoming the biasing force of spring 390 and shifting piston plunger 389 for pressure regulation when the pressure in line 392 exceeds sixty pounds per square inch.

A seal drain line 396 extends from behind the external oil seals (not shown) in converter 380 to the transmission sump 53 where it connects to a fitting (not shown) threaded into drain opening 397 (FIGURE 2). Oil flow from converter 380 passes through an outlet line 398 to a filter 399, and thence through a line 400 to a heat exchanger 401. An outlet line 402 extends from the heat exchanger 401 to a fitting (not shown) threaded into the transmission lubrication intake opening 403 which is formed in the transmission housing section 271 in alignment with the internal annular boss 289, and intersects an axially disposed passage 404, extending at right angles to opening 403. One end of a tubular conduit 405 fits in passage 404, its other end being fitted into an aligned passage 406 in the annular flange 269 of housing partition member 70. The passages 406 intersects a radially drilled passage 407, through the partition member 70, extending inwardly to the previously described annular groove 136 in commutator insert 123.

*Selector valve.*—With reference now to FIGURES 3 and 7, the high pressure oil line 382, from engine pump 370 (FIGURE 26), ends in a fitting (not shown) threaded into an opening 410 of flow control valve 383. Opening 410 is coextensive with an internal passage 411 that extends through the flow control valve and is intersected by a cross passage 412. An adjustable needle plunger 413 is threaded in the upper portion 414 of passage 411 for reciprocable adjustment relative to the inner section of passages 411 and 412, thereby enabling control of the flow of oil into passage 412. The two part housing of transmission selector valve 56 consists of a lower valve housing 415 and an upper actuator housing 416 and valve housing 415 has a vertical through bore 417 receiving a valve rotor 418. Loose rollers 419 and 420 at the bottom and the top respectively of rotor 418, rotatably journal the rotor in the through bore 417. Bottom rollers 419 are axially confined between a snap ring 421 engaging a groove inside the bore 417, and the lower shoulder 422 on rotor 418. Upper rollers 420 are confined between an upper rotor shoulder 423 and a snap ring 424 engaging a groove inside the bore 417. The control valve cross passage 412 communicates with an annular groove 426 in the lower end of valve rotor 418, from which radial openings 427 extend inwardly to an axial high pressure bore 428 extending the length of rotor 418. The axial bore 428 is closed at the bottom by a plug insert 429 and is also closed at the top by the plug shaped end 430 of a stub shaft 431. Stub shaft plug end 430 is non-rotatably secured in the end of rotor 418 as by a press fit and includes a flange 432 that abuts the top of rotor 418 for relative axial positioning. A valve rotor operating pinion gear 433 is held on the stub shaft 431 and locked against a tapered shoulder 434 by a nut 435.

The valve rotor pinion 433 is disposed inside the actuator housing 416 and is engaged by the teeth 436 of a valve rotor setting rack 437 (FIGURES 7 and 8) which is axially shiftable through a cylindrical bore 438 formed through cross member extensions 439 of actuator housing 416. Housing 416 is mounted on the valve housing 415 by a spigoted connection and is fastened to the top of valve housing 415 by bolts 440. Shown in FIGURE 8, rack 437 is provided with eight ratchet indentations 441 on the top which are aligned with eight similar indentations 441 on the bottom. These indentations are engaged by spring biased top and bottom ratchet detent plungers 442 located in upper and lower bosses 443 formed integral with actuator housing 416. Detent plungers 442 are retained in bores 444 provided in the upper and lower bosses 443 by bolts 445 threaded into the bores. The ratchet detent settings of rack 437 are coordinated with the valving of the valve rotor 418 so the ratchet settings of rack 437, as the rack moves from right to left (FIGURE 8), provides reverse, first, neutral, second, third, fourth, fifth and sixth speed settings. Rack 437 has end flats 446 with a transverse end hole 447 to provide means for attaching a manually controlled linkage (not shown). A similar means, if desired, could be provided on the other end of rack 437. A cap assembly 450 is fastened over the top opening 451 of the actuator housing 416 by the aforementioned bolts 440 and has a function to be later described. Both the upper and lower openings of the actuator housing 416 are identical and the housing 416 and rack 437 can be removed, turned upside down and replaced to suit the particular transmission installation.

The aforementioned annular groove 426 adjacent the lower end of the selector valve rotor 418 (FIGURE 7) is axially aligned with a port opening 452 in valve housing 415 which, as clearly illustrated in FIGURES 1 and 3, is mounted on a mounting pad 453 integral with transmission housing section 271 by bolts 454. When fastened to pad 453, the valve housing port opening 452 is aligned with a port 455 in the mounting pad, opening to a passage 456 in housing section 271 (FIGURE 3). Passage 456 intersects a vertical passage 457 through the upper wall of sump 53 and at its sump end, passage 457 is counterbored 458 to receive a reduced end portion 459 of the accumulator casing 357. A short passage 460 in the accumulator reduced end portion 459 provides coextensive fluid communication from vertical passage 457 to the upper end of accumulator chamber 368. Accumulator chamber 368 contains a piston 461 which is resiliently urged toward the top of chamber 368 by a compressed vertically disposed coil spring 462. The upper limit of travel of the piston 461 is determined by its abutment against an annular internal cylinder chamber shoulder 463, and lower limit of piston travel is determined by a plurality of radially disposed accumulator oil over-flow openings 464 positioned a short distance above the skirt of cylinder housing 357. When piston 461 moves downward past the overflow openings 464 excess accumulator oil will overflow into the sump 53 thus ceasing to exert a downward force against the piston 461. The top end of coil spring 462 is received in a recessed spring seat 465 formed in the underside of piston 461 and its bottom end is seated in a recessed seat formed in a sump spring cover plate 466 fastened over an aperture 467 in the lower sump wall by bolts. Aperture 467 is of sufficient diameter to permit through passage of the spring 466 when cover plate 466 is removed.

Returning now to FIGURE 7, any oil leakage from the annular lower rotor groove 426 to the intermediate open space 470 between valve rotor 418 and the wall of housing 415 is limited by an oil seal 471 in rotor groove 472, and leakage to the space 473 at the bottom of housing bore 417 is limited by an oil seal 474 positioned in rotor groove 475. The lower space 473 is closed at its bottom by a welch plug 476, and oil drainage to the transmission sump 53 is provided by port openings 477 which extend through the selector valve housing 417 and into aligned passages 478 through the mounting pad 453 into the interior of the intermediate transmission housing member 271. Oil drainage from selector valve housing space 470 to the sump 53 is provided by port openings 479 which extend through the valve housing 417 to aligned passages 480 passing through pad 453 into the interior of the intermediate transmission housing member 271. Numerous apertures in the wall between housing 271 and sump 53 permit all excess oil to drain down to the sump.

The selector valve cap assembly 450, mounted on the top of the actuator housing 416, caps the transmission breather path which is defined by openings 480 and 479, space 470 in the transmission selector valve 56, the pinion chamber 481 in the actuator housing 416, the upper actuator housing opening 451, cap chimney 482 and into the breather cap 483 of cap assembly 450.

With reference to FIGURES 7 and 8, a plurality of ports 486, 487, 488, 489, 490 and 491 are provided through the selector valve housing 416 from the inner cylindrical bore 417 and they are arranged in a vertical pattern. In assembly of the selector valve 56 on the transmission housing mounting pad 453 (FIGURE 3) the valve housing ports are coextensively aligned with transmission housing high pressure oil passages in the following manner: port 486 leads to a passage 492 (for clutch C–1); port 487 leads to a passage 493 (for brake B–1); port 488 leads to passage 494 (for clutch C–2); port 489 leads to a passage 495 (for brake B–2); port 490 leads to passage 496 (for brake B–3); and port 491 leads to a passage 497 (for brake B–4). The high pressure passages just referred to, cooperate with other passages, to be described, provided internally of the transmission housing members before communicating with the various clutch and brake piston actuators but, for purposes of simplicity, the diagrammatic drawings seen in FIGURES 26 through 29 are referenced only by the aforementioned high pressure passage numbers.

We refer now to FIGURE 10 which illustrates a developed layout of the valve ports in the selector valve rotor 418. At the right hand side of FIGURE 10, the vertical line labeled "Rev" indicates the portion of rotor 418 disposed adjacent the vertical line of ports in the valve casing 415 when the rotor 418 is in a reverse selection. Reverse position places rotor ports 500 and 501 in coextensive alignment with respective housing ports 486 and 489. When rotor 418 is rotated to first speed position which is the next vertical line to the left from reverse selection position, i.e., 45° from "Rev," rotor ports 502 and 503 are placed in coextensive alignment with respective housing ports 486 and 487. When the rotor 418 is placed in "Neut" (neutral) there are no rotor ports hence there is no alignment of high pressure rotor ports with housing ports. In second speed rotor position, 45° to the left of neutral the rotor ports 504 and 505 are placed in coextensive alignment with respective housing ports 488 and 489. Third speed rotor position, 45° to the left of second speed, place rotor ports 506 and 507 in coextensive alignment with respective housing ports 486 and 491. Fourth speed rotor position, 45° from third speed, places rotor ports 508 and 509 in coextensive alignment with housing ports 488 and 490. Fifth speed rotor position, 45° from fourth speed, places rotor ports 510 and 511 in coextensive alignment with housing ports 486 and 488. Sixth speed rotor position, 45° from fifth speed, places rotor ports 512 and 513 in coextensive alignment with housing ports 488 and 491. Various radially projecting bosses on the exterior of rotor 418 are provided for the rotor ports 500–513. These bosses vary in shape, such as projections 515 for ports 504, 505 and 513, or the enlarged projection boss 516 through which the three ports 500, 502 and 503 are formed, and all bosses project across the space 470 between the body of rotor 418 and the cylindrical wall of valve housing bore 417 and are so contoured to be disposed in close proximity with the cylindrical surface of the valve housing bore. These bosses 515, 516, etc., minimize loss of oil from the rotor ports 500 through 513 into the valve space 470. Note that high pressure oil is supplied to the rotor bore 428 through the lowermost radial openings 427 in the rotor 418, hence the high pressure oil will be directed through selected ones of the selector valve housing ports 486 through 491, dependent upon the rotor position. Note also that space 470 between the rotor and the valve housing will provide free fluid communication between any of the housing ports 486 through 491 that are not coextensively aligned with a rotor port in a specific rotor position, and the drain openings 479 in the valve housing 415.

High pressure oil passage 492 to the first clutch C–1 (FIGURE 16) passes into the inward annular boss 289 of transmission housing section 271 and intersects a lateral passage 518 which contains one end of a tubular conduit 519. Tubular conduit 519 extends through an aperture 520 in partition member 70 and has its other end fitted in a coextensive passage 521 formed in the front transmission housing member 55. A radially disposed passage 522 in front housing member 55 intersects passage 521 and connects through the previously described annular housing 98 into the annular groove 100. As has been described, the high pressure oil then follows a path through commutator aperture 102, hub groove 104, opening 107, passages 108 and 109 to the cylinder chamber 77 of clutch C–1.

High pressure oil line 494 to the second clutch C–2 (FIGURE 18) also passes into annular boss 289 of housing section 271 and intersects a lateral passage 524 which contains one end of a tubular conduit 525, the other end of which is fitted in a coextensive passage 526 in the axially disposed flange of transmission partition member 70. A radially disposed passage 527 in member 70 intersects passage 526 and provides fluid communication to a recessed cross duct 528, in commutator insert 123, connected to commutator groove 122, thence through an aperture 124, groove 125, opening 129, groove 130 and passage 131 to the cylinder chamber 118 of clutch C–2.

High pressure oil line 493 to the first planetary system brake B–1 (FIGURE 17) also passes into the annular boss 289 of housing section 271 and intersects a lateral passage 529 which contains one end of a tubular conduit 530, the other end of which is fitted in a coextensive passage 531 in the axially disposed peripheral flange 269 of partition member 70. A radially disposed passage 532 in partition member 70 extends from an intersection with passage 531 to a short lateral passage 533 leading to the cylinder chamber 275 behind piston 276 on the first brake B–1.

High pressure oil line 495 to the second planetary system brake B–2 (FIGURE 13) also passes into the annular boss 289 of housing section 271 and intersects a lateral passage 535, directed rearwardly, which contains one end of a tubular conduit 536, the other end of which is fitted into a coextensive passage 537 formed in the annular peripheral flange 294 of the rear housing partition member 200. A radially disposed passage 538 in partition member 200 extends from passage 537 to an intersection with a lateral passage 539 which leads to the cylinder chamber 293 behind piston 276' of the second brake B–2.

High pressure oil line 496 to the front brake B–3 of the third planetary system (FIGURE 14) also passes into the annular boss 289 of housing section 271 and intersects a lateral passage 540, directed rearwardly, which contains one end of a tubular conduit 541, the other end of which is fitted in a coextensive passage 542 formed in the annular peripheral flange 294 of the second partition member 200. A radially disposed passage 543 in the partition member 200 extends from passage 542 to intersect the upper edge of cylinder chamber 300 behind the piston 302 of the brake B–3.

High pressure oil line 497 to the rear brake B–4 of the third planetary system (FIGURE 15) also passes into the annular boss 289 of housing section 271 and intersects a lateral passage 545, directed rearwardly, which contains one end of a tubular conduit 546, the other end of which is fitted in a coextensive passage 547 formed in the annular peripheral flange 294 of the rear housing partition member 200. A radially disposed passage 548 in the partition member 200 extends inwardly from passage 547 to another rearwardly directed lateral passage 549 which is coextensively aligned with a lateral passage 550 through the intermediate cylindrical housing member 312, passage 550 in turn being coextensively aligned with a further lateral passage 551 in transmission housing end plate 237. A radially disposed passage 552 in end plate 237 extends inwardly from an intersection with lateral passage 551 to a short lateral passage 553 which leads to the cylinder chamber 322 behind piston 302' of the brake B–4.

FIGURE 7 shows the rotor 418 of the selector valve 56 in the second speed position and the various section details FIGURES 13 through 18, are sections with the rotor in the same position as in FIGURE 7. Note that FIGURES 13 and 18 illustrate the rotor bosses 515 positioned with ports 505 and 504 respectively directing high pressure oil to activate the brake B-2 and clutch C-2, while FIGURES 14 through 17 illustrate the drain space 470 around the valve rotor 418 connected to the various brakes and clutches, so they will be deactivated.

*Multi-Speed Transmission—Operation*

In FIGURES 26 through 32, the schematically illustrated transmission gears 171, 172, 161, 205, 195, 173, 204, 210, 216 and 219 are also lettered respectively A, B, C, D, E, F, G, H, J, and K for use in illustrative formulas for deriving the various transmission speeds. In the chart below, the letters, reference numerals and descriptive names of the transmission gears are set out with an exemplary gear tooth value noted for each gear. Such values, while entirely practical, are primarily set forth herein to aid the disclosure and may be varied to suit specific design requirements. In this chart, the first, second, and third planetary systems are designated P-1, P-2 and P-3.

| Letter | Reference numeral | Gear designation | Exemplary number of teeth |
|---|---|---|---|
| A | 171 | P-1 Ring gear | 78 |
| B | 172 | P-1 Planet pinion | 27 |
| C | 161 | P-1 Sun gear | 24 |
| D | 205 | P-2 Ring gear | 89 |
| E | 195 | P-2 Planet pinion (ring) | 25 |
| F | 173 | P-2 Planet pinion (sun) | 25 |
| G | 204 | P-2 Sun gear | 26 |
| H | 210 | P-3 Ring gear | 68 |
| J | 216 | P-3 Planet gear | 13 |
| K | 219 | P-3 Sun gear | 40 |

FIGURE 26 illustrates the first (1st) transmission speed in which the first clutch C-1 and first brake B-1 are actuated by selector valve 56 (see FIGURE 10 for the valve and rotor port relationship). Actuation of clutch C-1 furnishes torque from transmission input shaft 59 to the inner intermediate transmission shaft 95 to rotate the first planetary system sun gear 161; and actuation of brake B-1 causes the first planetary system ring gear 171 to be fixed relative to the transmission housing. Hence, the rotating sun gear 161, causes the first planetary system planet gears 172 to orbit about the fixed ring gear 171 in the same direction as the rotation of sun gear 161, thereby rotating compound planetary carrier assembly 178 which is fixed to and rotates the transmission output shaft 152 in the same direction as rotation of the input shaft 59. The first speed will have a transmission ratio equal to $$1 + \frac{A}{C} = 1 + \frac{78}{24} = 4.25$$

The exemplary number of gear teeth as listed in the above chart has been substituted for the respective gear letters in this and the following illustrative formulas.

FIGURE 27 illustrates the "reverse" speed in which the first clutch C-1 and the second brake B-2 are actuated by selector valve 56 (see FIGURE 10). Actuation of clutch C-1 furnishes torque from transmission input shaft 59 to the inner transmission shaft 95 to rotate the first planetary system sun gear 161; and actuation of brake B-2 causes the second planetary system ring gear 205 to be fixed relative to the transmission housing. The rotating sun gear 161 causes the first planetary gear system planet pinion 172 to rotate free of constraint by its ring gear 171 which is not braked in this condition. As planet pinion 172 is part of the compound planet pinion unit 175, the second planetary pinion 173 is rotated therewith and with its meshed pinion mate 195, which is also meshed with the fixed second planetary system ring gear 205, will orbit in a rotational direction reverse to the rotation of input sun gear 161. This reverse orbiting of the planets 172, 173 and 195 will rotate the planet carrier 178 and the output transmission shaft 152, fixed thereto, in a reverse direction. The reverse speed will have a transmission ratio equal to $$-1 + \left[\frac{DB}{FC}\right] = -1 + \left[\frac{89 \times 27}{25 \times 24}\right] = 3.00$$

FIGURE 28 illustrates the second (2nd) transmission speed, in which the second clutch C-2 and the second brake B-2 are actuated by the selector valve 56 (see FIGURE 10). Actuation of clutch C-2 furnishes torque from transmission input shaft 59 to the hollow intermediate transmission shaft 121 to rotate the first planetary system ring gear 171; and actuation of the brake B-2 causes the second planetary system ring gear 205 to be fixed relative to the transmission housing. This relationship between the planet gears 172, 173, 195 and the second planetary system fixed ring gear 205 is similar to that for the reverse drive (FIGURE 27) except that the first planetary system ring gear 171 instead of the sun gear 161 is now furnishing rotation to the compound planet pinion unit 175 and the planet rotation will therefore be opposite to that of the arrangement for reverse speed. Hence the planet orbiting and rotation of carrier 178 will be in the same direction as the direction of rotation of input shaft 59. The second speed ratio will be equal to $$1 + \left[\frac{DB}{FA}\right] = 1 + \left[\frac{89 \times 27}{25 \times 78}\right] = 2.23$$

FIGURE 29 illustrates the third (3rd) transmission speed, in which the first clutch C-1 and the rear brake B-4 of the third planetary system are actuated by the selector valve 56 (see FIGURE 10). Actuation of clutch C-1 furnishes torque from transmission input shaft 59 to the inner intermediate shaft 95 to rotate the first planetary sun gear 161; and actuation of the brake B-4 causes the third planetary system sun gear 219 to be fixed relative to the transmission housing. Rotation of sun gear 161 causes the compound planet units 175 to rotate on their unit axis imparting rotation to the second planetary system sun gear 204 in the same direction of rotation as the input shaft 59 and the first planetary system sun gear 161. As the sun gear 204 is rigidly secured to the third planetary system ring gear 210, it also rotates in the same direction as the input shaft 59, and causes its planet pinions 216 to orbit in the same direction about the third planetary system sun gear 219 which is fixed. The third planetary system planet pinion carrier 222 being fixed to the output transmission shaft 152 therefore rotates it in the same direction as the input shaft 59. In this third speed arrangement, the fixed tie-in of output transmission shaft 152 with the compound planet carrier 178 between the first and second planetary systems supplies a kick-back torque to that planet carrier 178 which imparts a rotational component to orbit the compound planet units 175 in the same direction as input shaft 59, sun gear 161, sun gear 204, ring gear 210, planet carrier 222 and output shaft 152. This kick-back tie-in prevents a rearward orbit of the compound planet units 175 and assures a positive torque path through gears 161, 172, 173, 204, 210 and 216 to the output transmission shaft 152. The third speed ratio will be equal to $$1 - \left[\frac{GB}{FC}\right] + \left[\left(1 + \frac{K}{H}\right)\left(\frac{GB}{FC}\right)\right] = 1 - \left[\frac{26 \times 27}{25 \times 24}\right] + \left[(1 + {}^{40}\!/_{68})\left(\frac{26 \times 27}{25 \times 24}\right)\right] = 1.69$$

FIGURE 30 illustrates the fourth (4th) transmission speed, in which the second clutch C-2 and the forward brake B-3 of the third planetary system are actuated by the selector valve 56 (see FIGURE 10). Actuation of clutch C-2 furnishes torque from the transmission input shaft 59 to the hollow intermediate transmission shaft 121 to rotate the first planetary system ring gear 171; and actuation of brake B-3 causes the second planetary system sun gear 204 to be fixed relative to the transmission housing. Rotation of ring gear 171, meshed with planet pinions 172 of the compound planet units 175, imparts rotation force to planet units 175 which, because the planet pinion 173 of each unit 175 is meshed with the fixed second planetary system sun gear 204, must orbit about the sun gear 204 in the same direction of rotation as that of ring gear 171 and the input transmission shaft 59. Hence the compound planet carrier 178 and output shaft 152, fixed thereto, will rotate in the same direction as input transmission shaft 59. The fourth speed ratio will be equal to $$1+\left(\frac{GB}{FA}\right)=1+\left[\frac{26\times 27}{25\times 78}\right]=1.36$$

FIGURE 31 illustrates the fifth (5th) transmission speed in which the first clutch C-1 and the second clutch C-2 are actuated by the selector valve 56 (see FIGURE 10). Actuation of clutches C-1 and C-2 furnishes direct drive torque from transmission input shaft 59 respectively to the first planetary system sun gear 161 and ring gear 171, locking the planet pinions 172 between the two gears 161 and 171 and causing the planet pinion to orbit and rotate its compound carrier 178 at the same rotational speed as the input transmission shaft 59. The compound planet carrier 178 being fixed to the output transmission shaft 152, will rotate the output transmission shaft 152 at the same speed as the input transmission shaft 59. The fifth speed, being a direct drive, the ratio is equal to one.

FIGURE 32 illustrates the sixth (6th) transmission speed in which the second clutch C-2 and the rear brake B-4 of the third planetary system are actuated by the selector valve 56 (see FIGURE 10). Actuation of clutch C-2 furnishes torque from the transmission input shaft 59 to the hollow intermediate transmission shaft 121 to rotate the first planetary system ring gear 171; and actuation of brake B-4 causes the third planetary system sun gear 219 to be fixed relative to the transmission housing. Rotation of ring gear 171 transmits force to the planet pinions 172 causing the compound planet units 175 to orbit in a rotational direction the same as that of the ring gear 171 and input shaft 59. The compound planet carrier 178 being fixed to the transmission output shaft 152 will rotate the output shaft in the same direction as the input shaft 59. In this sixth speed transmission arrangement the fixed tie-in of output transmission shaft 152 with the third planetary system planet carrier 222 supplies a kick-back torque to that carrier 222, which causes the third planetary system planets 216 to orbit about the third planetary sun gear 219, which is fixed, in the same direction of rotation as the input shaft 59. Orbiting of planets 216 around fixed sun gear 219 causes rotation of the planets 216 about their axis and also causes rotation of the third planetary system ring gear 210 with its connected second planetary sun gear 204 in the same direction of rotation as input transmission shaft 59. Such rotation of the second planetary sun gear 204, being meshed with the planet pinion 173 of the compound planet units 175, provides the necessary reaction to the compound planet units 175 to positively assure their orbital rotation in the same direction as the first planetary system ring gear 171 also causing a balanced increased orbital movement of compound planet units, because of the rotation imparted to the compound planets by sun gear 204. The sixth speed ratio will be equal to $$1+\left[\frac{GB}{FA}\right]-\left[1+\frac{K}{H}\right]\left[\frac{GB}{FA}\right]=1+\left[\frac{26\times 27}{25\times 78}\right]-\left[1+\frac{40}{68}\right]$$
$$\left[\frac{26\times 27}{25\times 78}\right]=0.788$$

*Four-Speed Modified Transmission*

FIGURE 5 illustrates a modified multispeed transmission 570 having four forward speeds and one reverse speed. The transmission 570 is similar in most respects to the six-speed transmission 50 but the third planetary system has been omitted. This necessitates some modification of the six-speed structure, which is illustrated in the sectional portion of FIGURE 5. To convert the six-speed transmission 50 as illustrated in the side section view of FIGURES 4 and 4A, to the four-speed transmission 570 (FIGURE 5), a flanged journal and thrust bearing 571 is provided between the first planetary system ring gear drive plate 164' and the planet carrier end plate 181'. Some of the six speed transmission elements (the second planetary system sun gear member 202, the rear circumferential housing member 312, housing end plate 237, the third planetary system 212, the fourth brake B-4, and portions such as the tubular conduit 546 of the high pressure oil line to brake B-4) are removed and replaced by a second planetary system sun gear member 202', transmission housing end plate 572 and an output shaft bearing support and spacer member 573. Modified sun gear member 202' is provided with an integral sun gear (not shown) but identical to the sun gear 204 in transmission 50, however its rear end is formed with flange plate 574 having peripheral splines 575 directly engaged to the B-3 brake disc 215". Housing end plate 572 has an annular axial recess 576 that cooperates with annular axially directed flange 313' of the second partition member 200' and housing end plate 572 is secured in place by studs 577 and nuts 578. A ball bearing 579 is held in place against a recessed shoulder 580 on opening 581 in end plate 572 by end cap 240' which is fastened to the housing end plate 572 by bolts. The end plate 572 is provided with an annular braking surface 582 which takes the place of braking surface 319 for brake B-3 in the six-speed transmission 50. Transmission output shaft 152' and its central oil lubricating passageway opening 153' are shortened and only one radial passage 583 extends through the shaft 152 instead of the two radial passages 248 and 249, shown in FIGURE 4A. All remaining elements of brake B-3 are identical to those of the six-speed transmission previously described.

In the four-speed transmission 570 of FIGURE 5 the first speed has a ratio of 4.25 and is obtained in the same manner (FIGURE 26) as the first speed of the sixth speed transmission 50. The second speed of transmission 570 has a ratio of 2.23 and is obtained in the same manner (FIGURE 28) as the second speed in transmission 50. The third speed of transmission 570 has a ratio of 1.36 obtained in the same manner (FIGURE 30) as the fourth speed in transmission 50. The fourth speed of transmission 570 having a ratio of 1 is obtained in the same manner (FIGURE 31) as the fifth speed in transmission 50. The reverse speed in both transmissions is obtained in the same manner (FIGURE 27) and has a ratio of 3.00.

*Torque Converter Transmission*

An integral torque converter and transmission unit 590 that can include either of the multi-speed transmissions 50 or 570 and a multi-stage hydraulic torque converter 380 is illustrated in FIGURE 6. The drive mechanism of FIGURE 1A shows the torque converter used with a six-speed transmission and rear transfer transmission. Whenever reference is made to multi-speed transmission 50 it is to be understood that the four-speed transmission 570 could also be used as the multi-speed transmission in unit 590. Although the illustrated combination in FIGURE 6 is an integrally assembled hydraulic torque converter-multi-stage transmission, the two units can be separately disposed and universally connected by appropriate drive fittings.

In FIGURE 6 the front housing member 55 of transmission 50 is replaced by a combination transmission housing-torque converter mount 591. The housing-mount member 591 has the same oil passageways as described for front housing member 55 and also has an annular peripheral mounting surface 592 to which a torque converter mount adapter 593 is fastened by bolts 594. Front transmission ball bearing 72 is mounted in an opening 595 through the front housing member 591 with the inner bearing race supporting the shortened hub 62' of front clutch case member 60'. The hub 62' is shortened because a transfer gear for the take-off transfer gearing hereinafter described in transmission 50 is not used and therefore enables the integral torque converter transmission 590 to be of more compact construction. The transmission input shaft 59 (FIGURE 4) is replaced by an integral torque converter output and transmission unit input shaft 596 which has external splines 597 engaged with the internal splines 63' of clutch case hub 62'. An annular brake member 598 is disposed and secured between the front surface of the converter mount adapter 593 and a torque converter bell housing 599 by a plurality of circumferentially spaced bolts 600 which project from within mount adapter 593 through brake member 598 and are threaded into the converter bell housing 599. The power plant flywheel 602, which carries a timing and auxiliary equipment drive gear 603, is drive connected to a radial flange 604 of a drive connection assembly 605 by bolts which pass through openings in flange 604 into the flywheel 602. Drive connection assembly 605 has a tubular outer member 607 with the integral radially outwardly directed flange 604, an inner tubular member 608 with an inner radial flange 609 and a resilient member 610 between and bonded to the telescoped tubular drive members 607 and 608. Bolts 611 pass through holes in the inner radial flange 609 of inner tubular member 608, through circumferentially arranged axially directed holes in a direct drive clutch plate 612 and thence into threaded openings 613 in a torque converter case input member 615, securing the drive connection assembly 605, the direct drive clutch plate 612 and converter input member 615 in fixed inter-relationship. Converter input member 615 is secured by bolts 616 to the front peripheral edge of a converter bell case member 617 and an annular axially disposed flange projection 618 of the input member 615 is spigoted and sealed in the peripheral recess 619 of the converter bell case 617. Converter bell case 617 is provided with a plurality of external reinforcement flanges 620 and with integral internal converter pump blades 621 and is secured on a hub member 622 by rivets 623 through an integral bell case inner flange 624 and a radial flange 625 integrally formed on hub member 622. Bell case hub member 622 is rotatably journalled on a tubular member 626 by a needle bearing 627 and includes an auxiliary equipment drive gear 628 integrally formed on its rearward end.

An oil seal 629 is supported in an internal radial flange 630 of the bell housing member 599 and seals between the bell housing flange 630 and bell case hub member 622. The torque converter case input member 615 and the converter bell case member 617 constitute the revolving housing of torque converter 380 which is a revolving housing type that will transform into a fluid coupling when the torque ratio approaches 1 to 1.

The first stage converter turbine blades 632 in the multi-stage hydraulic torque converter 380, are integrally formed or otherwise suitably fixed in a ring member 633 which is fastened by bolts 634 to a converter output member 636. The second stage converter turbine blades 637 are integrally formed or otherwise suitably fixed between an inner ring 638 and an outer ring 639, the inner ring 638 being fastened to the first stage inner ring member 635 by bolts 640. Converter turbine reactor blades 641 are held between the stage one turbine blades 632 and stage two turbine blades 637 by an inner reactor ring 642 fastened on a tubular member 643 by bolts which pass through a front flange 644 of the tubular member 643 and thread into the inner reactor ring 642. The tubular member 643 is rotatably mounted on an inner fixed tubular member 645 by two ball bearings 646, between which, two sprag clutch assemblies 647 are mounted to limit possible rotation of the reactor ring assembly 641 through 644 to one direction. The rearwardly disposed end of outer tubular member 643 has internal splines 648 engaged with external splines 649 on the forward end of tubular member 626 and the rearward end of tubular member 626 has external splines 650 engaged with internal splines 651 on a brake flange plate 652. The tubular member 626 is rotatably supported on the fixed inner tubular member 645 by a needle bearing 653 and is axially positioned by abutment between the outer race of rear bearing 646 and a bearing ring 654, at its rear end, abutting a rear radial flange 656 on the fixed tubular member 645. The rear radial flange 656 is secured to the converter mount adapter 593 by bolts.

Converter output member 636 has internal splines 657 engaged with external splines 658 on the converter output shaft 596, and is also provided with an outer peripheral flange 659 which has external splines 660 engaged with internal spline teeth 661 on a clutch disc 662 of the converter clutch assembly 663. A ball bearing 664 provides journalled support between the input clutch plate 612 and converter output member 636 and helps to maintain alignment between the input clutch plate 612 and converter output shaft 596. Converter clutch input member 612 is provided with an annular cylinder chamber 665 on its rearward side which contains an annular piston 666. An oil ring 667 is disposed in an annular groove 668 in the outer periphery of piston 666 to limit loss of oil along cylinder chamber wall 669 and a second oil ring 670, placed in an annular groove 671 formed in the inner cylinder chamber walls 672, limits loss of oil between piston 666 and cylinder walls 672.

Several stub posts 674 are riveted to the converter clutch input member 612 and project from the inside of the end wall of cylinder chamber 665 into blind bores 675 provided in the working face of piston 666 to prevent relative rotation between the piston 666 and input plate member 612, yet permitting axial movement of piston 666. Clutch disc 662 is pressed tightly between an axially fixed clutch surface 676 on the converter input case member 615 and an opposed clutch surface 677 of the axially shiftable piston 666 when fluid under pressure is introduced into chamber 665 behind the piston 666 to shift the piston, thereby establishing a direct drive from the input clutch plate 612 through clutch assembly 663 (including disc 662) and splines 660 and 661 to the converter output member 636 and converter output shaft 596.

Brake flange plate 652 has outer peripheral splines 678 engaged within internal spline teeth 679 of a brake disc 680 in a brake assembly 681. The torque converter adapter mount 593 is provided with an annular cylinder chamber 682 in its front face which contains an annular brake piston 683. An oil ring 684 in an annular groove 685 in the inner cylinder chamber wall 686 limits loss of oil along the inner cylinder chamber wall 686 and a second oil ring 687 in an annular groove 688 formed in the outer periphery of piston 683 limits loss of oil between piston 683 and cylinder wall 689. Stub posts 691 are riveted to adapter mount 593 and are disposed in the brake cylinders 682 so they project in an axial direction into blind bores 692 in the piston 683 for preventing relative rotation between piston 683 and adapter mount 593, yet permitting axial movement of the piston 683.

The aforementioned axially fixed brake member 598 is disposed in front of the brake piston 683 and the brake disc 680, and has a braking face 693 arranged to be engaged by disc 680 when the brake disc 680 is pressed tightly between the brake face 693 of brake member 598 and an opposed brake face 694 on piston 683 when the piston 683 is axially shifted by oil pressure toward brake member 598. This actuation will stop rotation of brake flange plate 652, tubular member 626 and tubular member 643 which carries the assembly 642, 641 so the reactor blades 641 remain motionless in moving converter fluid to thereby utilize the torque converter 380 as a dynamic brake.

A plurality of circumferentially spaced compression coil springs 695 are seated in circumferentially spaced recesses 696 in the rear side of brake member 598, radially outward from its brake face 693, and bear against the piston 683 to continually urge the piston and thus the brake assembly 681 toward the deactivated position.

An oil passage 697 in the lower portion of torque converter adapter mount 593 leads to an external fitting 698 (FIGURE 26) which serves as a connection for the converter oil charging line 392 (FIGURE 26). Still referring to FIGURE 6, a short passage 699 adjacent the inner periphery of adapter mount 593, and in the adapter, leads forward from an intersection with passage 697, through an annular divertor ring 700 and connects the charging oil passage line 697 to an annular space 701 between the converter output shaft 596 and the fixed tubular member 645. From the annular space 701, charging oil can flow through a radial opening 702 in the fixed tubular member 645 and a radial opening 703 in tubular member 626 into an annular space 704 below the ring of the second stage turbine blades 637, from which space the incoming charging oil is drawn into the pump blades 621 of the hydraulic torque converter 380. An inner annular constriction 706 on the fixed tubular member 645, limits flow of charging oil along the shaft 596. Circulating oil from the converter 380 passes from the forward annular space 707 between converter output member 636 and radial flange 644 of the tubular member 643 to an annular space 708 between the converter output shaft 596 and the fixed tubular member 645 which is forward of the constriction 706 and a radial passage 709 in output shaft 596 connects the annular space 708 to a further annular space 710 inside of the output shaft 596 and between the wall of an undercut opening 711 and a tube insert 712.

A radial passage 713 extends from inner annular space 710 through the output shaft 596 to an annular groove 714 in the divertor ring 700. A cross groove in the divertor ring 700 connects its annular groove 714 with a short passage 716 in the upper portion of the inner periphery of adapter 593, which passage intersects a radial passage 717 also in the adapter 593. Passage 717 connects by means of a fitting 718 (FIGURE 26) to the converter oil discharge line 398. The previously described oil seal ring 629 and the oil seal rings 720 in annular grooves provided in the tubular member 626 confine the converter charging oil to the torque converter proper of the torque converter assembly 380. An oil drain passage 721 at the rear lower side of bell housing 599 leads to an opening 722 in brake member 598, a coextensive opening 723 in adapter mount 593 and an opening 724 in the front wall of transmission housing converter mount 591 and permits drain oil to flow to the transmission sump 53. These drain openings are the equivalent of the drain line 396 shown in FIGURE 26.

An oil passage (not shown) formed in the converter adapter mount 593 connects the converter selector valve 378 (FIGURE 26) to an annular groove 727 in shaft 596 between oil seals 728 and a radial passage 729 extends from the annular groove 627 to and through the wall of tube insert 712, which provides an extension of an axial bore 730 through the undercut opening 711. Axial bore 730 has its rearward opening closed with a threaded plug insert 731, and its front end opens into a small central chamber 732 in the converter clutch input plate 612. A diagonal passage 733 extends from the central chamber 732 to the clutch cylinder chamber 665. An oil passage 734 is provided in the adapter mount 593 from the brake cylinder chamber 682 and connects, through passages (not shown) to the converter selector valve 378.

Power Take-Off Transfer Gearing

With reference to FIGURES 2 and 33, a transfer gear 740 is keyed at 741 to the multi-speed transmission clutch case front hub 62 and is axially restrained between the inner race of ball bearing 72 and the hub commutator portion 106.

Referring specifically to FIGURE 33, the transfer gear 740 meshes with a transfer idler gear 742 which in turn meshes with a take-off shaft gear 743. The idler gear 742 is mounted and rotatably journalled by a ball bearing 744 disposed on the spindle shank 745 of a bolt 746 which extends through an opening 747 in a forwardly protruding boss 748 on the off-set front wall 749 of the front transmission (transfer gear) housing 55 by a nut 750. Take-off shaft gear 743 may be internally splined (not shown) to a power take-off shaft 751 if desired, however the preferred embodiment, as illustrated, has the take-off gear 743 rotatably journalled on the end 752 of the power take-off shaft 751. Take-off shaft 751 extends from the transfer gear housing 55, through the transmission sump 53 and through the rear wall 753 of sump 53. The take-off gear 743 has a forward hub extension 754 which is journalled and supported by a ball bearing 756 held in place in an opening 757 in the off-set front wall 749 by a snap ring 758. The forward end 752 of take-off shaft 751 is journalled within the take-off gear 743, as before described, and is thereby supported by the gear 743 through bearing 756. A cover plate 759 is fastened on the wall 749 over the opening 757 by bolts. Shaft 751 is supported at its rear end by a ball bearing 760 disposed in an opening 761 in the rear sump wall 753 and maintained in place by a snap ring 762. An oil seal retainer 763 carrying oil seal ring 764 is fastened to wall 753, around shaft 751, by bolts. The oil seal ring 764 cooperates with the hub 765 of the flanged take-off member 54 which has internal splines 767 engaged with external splines 768 of shaft 751. Take-off member 54 is axially secured by a nut 769 on the threaded end 770 of shaft 751.

In the preferred embodiment, with take-off shaft 751 rotatably journalled at front end 752 in the gear 743, a portion of the shaft 751 adjacent gear 743 is provided with axially disposed splines 772 that engage an axially shiftable clutch collar 773. The clutch collar 773 has external clutch splines 774 which can engage internal clutch splines 775, formed integral with gear 743, when the clutch collar 773 is shifted forward to provide a through power drive from the multi-speed transmission input shaft 59 to the take-off shaft 751. Clutch collar 773 has an annular groove 776, behind clutch splines 774, which is engaged by a shift fork 777 of a power take-off clutch operating mechanism 778.

Transfer Transmission

FIGURES 1 and 34 through 37 illustrate a transfer transmission 790 that is mounted on the rear end of a six-speed transmission 50. Transfer transmission 790 can be provided on either the four or six-speed transmission, in which case the transmission rear end plate 237 (FIGURES 1 and 4A) is replaced by a combination transmission end plate and transfer transmission adapter mount 791, which is secured to the intermediate cylindrical transmission housing member 312 in substantially the same manner as is the end plate 237. The adapter mount 791 is provided with a cylinder chamber 322', identical to the chamber 322 in end plate 237, which contains the piston 302' of the third planetary system brake B–4. A ball bearing 792, which replaces bearing 235, is disposed in a central opening 793 of adapter 791 and is secured by a ring 794 fastened to adapter plate 791 by bolts. A spacer 796 on a shortened extension 231' of the third planetary system carrier hub 230' restrains sun gear 219 in axial position. The inner race of ball bearing 792 supports a forward hub extension 797 of a transfer gear 798 which has internal splines 799 engaged with external splines 800 on the transmission output shaft 152 and is axially secured to transmission output shaft 152 by plate 801 and bolts 802. An oil seal 803 is disposed against a shoulder 804 of the opening 793, in the adapter end plate 791, which circumscribes the spacer 796.

A housing 805 for the transfer transmission is fastened to adapter end plate 791 by studs 309 and nuts 317. Transfer transmission housing 805 encloses the transfer gear 798, a drop gear 806 (FIGURE 37) and a lower transfer gear 807 directly below the upper transfer gear 798. Upper transfer gear 798 includes a rear hub extension 808 journalled by roller bearing 809. The roller bearing retainer ring 810 is held in an opening 811 of the transfer transmission housing 805 by a snap ring 812 and an output housing 813 which is bolted on the transfer transmission housing 805.

Output housing 813 partially encloses a short output shaft 815 which has a front extension 816 disposed coaxially within the upper gear rear hub extension 808 and is journalled therein by a roller bearing 817 having a single inner retainer ring 818 axially fixed on the front end 819 of output shaft extension 816 between a shaft shoulder 820 and an end snap ring 821. The bearing rollers engage a cylindrical inner surface 822 located inside the transfer gear 798. The rear end 823 of output shaft 115 is supported by a ball bearing 824, axially located on output shaft shank 823 between the shaft shoulder 825 and forward end of a hub extension 826 of a flanged output member 827. Output member 827 has internal splines 828 engaged with external splines 829 of shaft end 823 and is held on the shaft 815 by a plate 830 fastened with bolts. The ball bearing 824 is retained in an opening 832 of output housing 813 by a snap ring 833 and end cap 834 which is fastened by bolts on the output housing 813. End cap 834 has a central opening 835 which holds an oil seal 836 around the hub 826 of the flanged output member 827.

Output shaft 815 is formed with an intermediate thick radial flange 837 having a cylindrical exterior splined surface 838 that carries an axially shiftable clutch collar 839. Internal splines 840 of the clutch collar 839 engage the splined surface 838 and, when shifted axially forward, can engage with external clutch splines 841 formed closely adjacent the end hub extension 808 on the upper transfer gear 798, resulting in a direct through drive from the multi-speed transmission out-put shaft 152, through the transfer gear 798 to the short output shaft 815.

One diametrically opposed set of internal clutch collar splines 840 are provided with collar detent retaining notches 842, and 843, the notches 843 being for the clutch collar disengaged position and notches 842 being for the clutch collar engaged position. A transverse diametrical bore 844 is formed through the short output shaft 815 at the fixed radial flange 837, opening in diametrically opposed grooves, between the splines 838 on the radial flange 837, that are matched during assembly with the aforementioned splines 840. Disposed in bore 844 are a spring 845 and two detent plungers 846 for detent cooperation with the indented notches 842 and 843 as is clearly shown in FIGURE 35. Clutch collar 839 has an annular groove 847 in its circumferential periphery, engaged by a shift fork 848 of a shift mechanism assembly 849 (FIGURE 1) similar to the shift mechanism 778 which may be seen in FIGURE 33.

As shown in FIGURE 37, the drop gear 806 is rotatably journalled on roller thrust bearings 850 and 851 carried on a fixed countershaft in a position whereby gear 806 meshes with the upper transfer gear 798 and lower transfer gear 807. The countershaft 852 is mounted at its forward end in an opening 853 in the forward wall 854 of the transfer transmission housing 805, and at its rear end in an opening 855 in the integral rear wall 856 of transfer housing 805. Countershaft 852 is locked in its axial position, with the inner race of bearing 850 abutting a countershaft shoulder 857 and with the inner race of bearing 851 abutting the rear wall 856, by a nut and lock nut assembly 858 fastened tightly on the end of the shaft 852 against the exterior of wall 856.

Lower transfer gear 807 is rotatably journalled by needle bearings 859 on a transfer transmission lower output shaft 860 which is rotatably journalled in transfer transmission housing 805 by ball bearings 861 and 862. The inner race of ball bearing 862 is axially positioned on the rear shank 863 of shaft 860 between shaft shoulder 864 and the end of an extended hub 865 of a flanged output coupling member 866, and is held in place in an opening 867 through the rear housing wall 856 by a snap ring 869 and a cap member 870 fastened by bolts to the housing wall. Cap member 870 carries an oil seal 871 around the flanged output member hub 865. Flanged output coupling member 866 has internal splines 873 engaged with external splines 874 on shaft 860 and is axially maintained on shaft 860 by a plate 875 fastened with bolts. Ball bearing 861, which is disposed in an opening 876 of inner wall 854, is axially restrained in its position on the front shank 877 of lower output shaft 860 between a ring spacer 878 and a snap ring 879. Cooperation between snap ring 879, bearing 861 and the spacer ring 878 retains the lower gear 807 against an integral thick radial flange 880 on the lower output shaft 860. The thick radial flange 880 has external splines 881 and non-rotatably mounts an axially shiftable clutch collar 882 having internal splines 883 engaged with the external splines 881. Clutch collar 882 is shiftable for clutching engagement with external splines 884 formed integral with the lower transfer gear 807, thus providing a direct drive from the multi-speed transmission output shaft 152 through upper gear 798, drop gear 806 and lower gear 807 to the shaft 860. Detent structure 886 is provided for the lower clutch collar 882 and is similar to that described for the upper clutch collar 839. Clutch collar 882 has, in its circumferential periphery, an annular groove 887 which is engaged by a shift fork (not shown) of a lower clutch shift mechanism assembly 885 (see FIGURE 1) similar to the shift mechanism 778 seen in FIGURE 33.

Immediately forward of the front lower bearing 861 is a speedometer take-off member 888 meshed with and driven by a gear 889 which has internal splines 890 engaged with external splines 891 on the front end of lower transfer shaft 860. Gear 889 is axially restrained on shaft 860 between the aforementioned snap ring 879 and a sealing O-ring 892. A cap member 893 encircles the forward end of the lower shaft 860 and is fastened to the forward wall 854 of the transfer transmission housing 805 by bolts, and has an oil seal 894 disposed in a central cap opening 895 to limit loss of oil through the cap member 893 from the transfer transmission housing. The oil seal 894 engages the external surface 896 of an internally splined tubular shaft coupling 897 which is axially secured in splined engagement with splines 891 of the lower transfer shaft 860 by a transverse pin 898 pressed through a cross bore 899 in the lower shaft and through openings 900 in the tubular coupling 897. The O-ring 892 prevents loss of oil between the shaft 860 and tubular coupling 897.

In the event no front axle drive is desired, the tubular coupling 897 can be removed (see FIGURE 1A, an arrangement omitting the front axle drive) and the O-ring 892 replaced with a snap ring (not shown) to restrain the speedometer take-off gear 889 in its proper position on shaft 860 against the snap ring 879. The cap oil seal 895 will also be removed and replaced with a closure cap 901 which fully covers the forward end of shaft 860.

Internal splines 903 of the tubular coupling 897 engage external splines 904 of a rearwardly extended forward transfer transmission shaft 905, to provide drive power for a vehicle front axle (not shown). In FIGURE 36, forward shaft 905 extends through a tunnel tube 906 which is disposed through the multi-speed transmission sump 53 from back to front. The tunnel tube 906 is supported in an opening 907 in the rear wall 753 of sump 53 by a flanged tube mount adapter 908 fastened to the rear sump wall 753 by bolts. The tube 906 is spaced vertically below the transmission output shaft 152 and is coaxial with the axis of the lower transfer output shaft 860. The forward end of tunnel tube 806 is supported in an opening 909 through the forward wall 369 of sump 53 and has a small outwardly disposed radial flange 910 that fits in a counterbore 911 of opening 909. Note that tunnel tube 906 is inserted into the sump 53 from front to back and it is axially fixed with the tube flange 910 in counterbore 911 between the end of an axial flange 912 on a shaft bearing mount member 913 (which flange 912 extends into the counterbore 911) and a seal ring 914, such as an O-ring, disposed between the tube flange 910 and the counterbore end wall shoulder. A similar seal ring 916 is located in an annular recess in the rear tunnel tube adapter 908 and seals against the tunnel tube 906.

The forward drive shaft 905 is supported at its front end by a ball bearing 917, the inner race of which is axially positioned on a cylindrical shaft surface 918 and maintained against an integral shaft shoulder 919 by the end surface of an extended hub 920 of a flanged forward coupling member 921 which has internal splines 922 engaged with external splines 923 on the front end of shaft 905. The forward coupling member 921 is securely fastened by bolts and plate 924 to the front end of shaft 905. The shaft 905 and coupling 921 are axially maintained relative to the sump walls by disposing the outer race of ball bearing 917 in an annular recess 926 of front bearing mount member 913 and clamping the outer race of the bearing therein by a ring shaped bearing mount member cap 927 which is bolted to the mount member 913 and to the front sump wall 369 by long bolts 928. Bearing 917 can be lubricated through a lubrication fitting 929 on the bearing mount cap 927.

Appropriate integral mounting pad bosses 930, 932, 934 and 936 are provided on the various housing sections of the converter, transmission and transfer transmission and can be located to suit particular installations.

From the foregoing description it is apparent that there are hereby disclosed new improved semi-automatic multi-speed planetary transmissions, including transmission units driven by a prime mover acting through a multi-stage hydraulic torque converter. The preferred embodiment disclosed a novel six-speed transmission which may comprise an integral unit with a multi-stage hydraulic torque converter. The six-speed transmission unit has three planetary gear systems of which the first two are main planetary systems in compound relation and the third planetary gear system is a small secondary planetary system. The carriers of all of the planetary systems are rotationally fixed to the transmission output shaft. The six-speed transmission can be readily and easily converted to a four-speed transmission unit using the same two main planetary systems but with the third planetary system of the six-speed unit removed and with third planetary system associated members either removed or modified.

The foregoing description also discloses a novel transmission hydraulic selector valve having a valve rotor journalled in loose rollers as bearings and the rotor is rotatable between and through multiple speed ratio settings within a stationary housing. An auxiliary pump is disclosed, which is operated through cooperation with the cammed outer periphery of an output shaft flange to which the compounded carrier system of the first two planetary systems is fixed. This auxiliary pump is so constructed to operate only when the vehicle is being pushed to be started, or vehicle movement is being used to start the engine.

The invention further discloses the novel combination of an engine driven pump, an auxiliary pump and a hydraulic system common to both a multi-stage hydraulic torque converter and a semi-automatic multi-speed transmission which eliminates unnecessary duplication of hydraulic components. It also discloses an oil pressure accumulator for the hydraulic system built into the transmission oil sump and which utilizes a biasing compression coil spring disposed for ready access providing ease in servicing. A ball type dump valve is utilized in a novel manner with each clutch in a revolving transmission clutch assembly and the dump valves are effective to neutralize centrifugal force acting upon a theoretical radial column of oil extending from the valve ball radial position to the hydraulic line commutator radial position, all radii and radial positions being in relation to the transmission axis.

The invention also discloses a two stage torque converter of the revolving housing type, reduced in length, which will automatically transform into a fluid coupling when the torque ratio, input to output, approaches one to one. The disclosed torque converter may be utilized as a dynamic brake by actuating a hydraulic brake assembly in the converter to lock the normally overrunning guide ring or reactor ring of the converter.

The torque converter can be made integral or disposed separate from the multi-stage transmission and, in lieu of a torque converter, an intermediate transmission can be used, between the engine and the multi-stage transmission, having multiple speed ratios chosen to permit a continuous range of speeds from the multi-stage transmission range in one of the intermediate transmission settings through the multi-stage transmission range in the next intermediate transmission setting.

The application further discloses new power take-off constructions which clutch to or from the take-off drive. It discloses a new drop gear transfer transmission at the rear of the multi-speed transmission in which the lower transfer gear can drive the vehicle and the upper drive shaft output can be used to drive such mechanisms as concrete pumps. The latter transfer transmission may also be provided with a forwardly extended output shaft, through a tunnel disposed in the sump, for front axle drive in a 4 x 4 or a 6 x 6 drive.

Finally, the invention discloses a rugged, highly compact, dependable multi-speed transmission, which is the result of extensive research and development in a field that for many years has been striving to develop an economic multispeed transmission of this type, which is also dependable during rigorous conditions of operation such as are experienced in present day use. A portion of the satisfactory results stems from the compact nature of the transmission which is partially attained by using interchangeable parts in the various brakes and clutches.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A vehicle drive mechanism for drive connection with a prime mover, comprising: a multi-stage hydraulic torque converter; a multi-speed hydraulically actuated transmission having a housing and powered by said torque converter, comprising at least two planetary gear systems in compound relation and having an output member; first hydraulic means for selective control and actuation of said torque converter; second hydraulic means for selective control and actuation of said transmission; a common hydraulic oil system in fluid communication with said torque converter, said transmission and with said first and second hydraulic means for supplying actuating fluid to said first and second hydraulic means, working oil for said torque converter and lubrication for said drive mechanism; said oil supply system comprising a common sump in said transmission housing, a prime mover driven pump to supply high pressure oil to a high pressure portion of said supply system, pressure regulating means in fluid communication between the high pressure supply and said first and second hydraulic means including means for controlling pressure of working oil supplied to said torque converter, and a system oil accumulator and an auxiliary pump located in said transmission sump; means rotatable with said output member and adapted to engage and to operate said auxiliary pump; and means in said oil supply system, operative during operation of said prime mover driven pump, to maintain said auxiliary pump out of operative engagement with said means rotatably fixed on said output member to thereby render said auxiliary pump inoperative.

2. In the vehicle drive mechanism as defined in claim 1, said torque converter having an output member integral with said multi-speed transmission input shaft, and said transmission housing having a front housing section with means providing rotatable support for said input shaft and to mount said hyraulic torque converter, a portion of said common hydraulic sytem being included in said front housing section to provide fluid communication between said system and components of said transmission.

3. A vehicle drive mechanism as defined in claim 1, including a transfer gear transmission means mounted on the rear of said multi-speed transmission housing comprising: an upper output shaft coaxially aligned with the output shaft of said multi-speed transmission, clutch means between said multi-speed transmission output shaft and said upper output shaft, a lower output shaft in said gear transmission means parallel with said upper output shaft and disposed radially beyond the outer perimetral boundary of said planetary gear systems, transfer gearing in said transfer gear transmission means and means for providing controllable drive engagement between said multi-speed transmission output shaft, said transfer gearing and said lower output shaft.

4. A vehicle drive mechanism as defined in claim 3 including: an output drive shaft for a front axle drive coupled to said lower output shaft, a tunnel through said multi-speed transmission, said front axle output drive shaft extending toward the front from said rear mounted transfer transmission gear means and through the tunnel in said multi-speed transmission.

5. A vehicle drive mechanism as defined in claim 1, including a power take-off from said multi-speed transmission comprising: transfer gear means mounted on said transmission housing, a power take-off shaft radially offset from the axis of said planetary system beyond their perimetral boundary and extending through said oil sump to the exterior of said sump and clutch means between said transfer gear means and said power take-off for engaging and disengaging said power take-off.

6. A drive mechanism comprising: a transmission housing, a multi-speed planetary system transmission in said housing including an input member and comprising an output shaft, a plurality of compounded planetary systems having planet pinion carrier means directly connected to said output shaft, at least two clutch devices for selectively connecting said input member to either one or both of the sun and ring gears of one of said planetary systems, at least one other of said planetary systems having planet pinions consisting of dual sets of intermeshed pinions one of which is meshed with the ring gear of its planetary system and one of which is meshed with the sun gear of its planetary system, means for selectively braking the ring gears of each planetary system, means for selectively braking the sun gear of the planetary system having dual sets of planet pinions; and a hydraulic system for operating and controlling said transmission.

7. A drive mechanism as defined in claim 6 wherein said hydraulic system includes: a main prime mover driven pump, an auxiliary pump in said transmission housing adapted to be operated by said transmission output shaft, and automatic means responsive to main pump pressure for disabling said auxiliary pump.

8. A drive mechanism as defined in claim 6 wherein: a transfer transmission, having a plurality of selectively engageable drive outputs, is mounted on the multi-speed transmission housing and is drive connected to said transmission output shaft.

9. A drive mechanism as defined in claim 8 wherein one of said transfer transmission outputs comprises an in-line drive adapted to connect to front and rear axles of a vehicle and passes through said multi-speed transmission.

10. A drive mechanism as defined in claim 1, wherein said auxiliary pump includes a cylinder having an end wall with an aperture therethrough, a piston in said cylinder, a rod connected with said piston whereby said rod projects through said end wall aperture, said means rotatably fixed on said shaft is a radial flange having cam flats formed on its periphery, a resilient means biases said piston and rod toward engagement with said cam flat periphery, and said means in said oil supply system rendered operative upon operation of said prime mover driven pump includes means to divert high pressure oil from said prime mover driven pump to the rod side of said piston to hold said piston and rod out of engagement with said flanged periphery.

11. A multi-speed transmission with a plurality of planetary gear systems in compound relation, having six speeds in forward, a neutral and one speed in reverse, comprising: a rotatable transmission output member with a flange non-rotatably fixed thereto; a carrier for two of said planetary gear systems non-rotatably fixed to said output member flange; a third planetary gear system in compound relation with said second planetary gear system and having a planet carrier non-rotatably fixed to said transmission output member; cam flats formed on the outer periphery of said flange; an auxiliary oil pump with a cylinder chamber, a plunger rod, a piston in said cylinder chamber, a coil spring, and a retainer at the bottom of said auxiliary oil pump which holds said coil spring in resilient engagement with the bottom of said piston to resiliently bias said integral piston and plunger rod whereby the plunger rod end is biased to ride in engagement with the cam periphery of said flange; an oil sump at the bottom of said transmission; said auxiliary oil pump extending into said oil sump so as to be immersed in oil; an oil accumulator in said transmission; a rotatable clutch housing in said transmission containing two clutches; one input shaft, drive connected to said clutch housing; two concentric output shaft members, one being drive connected between one of said clutches and the sun gear of the first planetary system and the other output shaft member being drive connected between the other of said clutches and the ring gear of the first planetary system; four brakes in said transmission, one brake having its rotatable means fixed to and rotatable with the ring gear of said first planetary gear system; the second brake having its rotatable means fixed to and rotatable with the ring gear of said second planetary gear system; the third brake having its rotatable means fixed to and rotatable with a ring gear of said third planetary gear system and the fourth brake having its rotatable means fixed to and rotatable with the sun gear of said third planetary gear system; a hydraulic system including said accumulator and auxiliary pump, a speed actuating selector valve and a high pressure supply line in fluid communication with said accumulator, pump and selector valve, said speed actuating selector valve being mounted on said multi-speed transmission and having means enabling said valve to be effective to selectively direct high pressure fluid to actuate the two said clutches and four said brakes in various combinations of two to thereby provide the six forward and one reverse transmission speeds.

12. A multi-speed transmission of at least two planetary gear systems, which are in compound relation, with at least four speeds in forward, a neutral and one speed in reverse comprising: a transmission output shaft with a flange non-rotatably fixed to said output shaft flange; cam flats formed on the outer periphery of said flange; a hydraulic system with a speed actuating selector valve means for said multi-speed transmission; a rotatable clutch housing in said transmission; two clutches within said clutch housing; one input shaft leading to and two concentric output shaft members leading from said rotatable clutch housing, said two clutches being selectively operable by said selector valve to connect the said input shaft to either one or both of said output shaft members; one of said output shaft members being drive connected to the sun gear of the first planetary system and the other being drive connected to the ring gear of the first planetary system; at least three brakes in said transmission, one brake having its rotatable means fixed to and rotatable with the ring gear of the first planetary gear system, the second brake having its rotatable means fixed to and rotatable with the ring gear of the second planetary gear system and the third brake having its rotatable means fixed to and rotatable with the sun gear of the second planetary gear system; said speed actuating selector valve means having hydraulic system connections to said clutches and brakes and selectively operative to and through speed settings effective to actuate the said clutches and said brakes in various combinations of two to give at least the four forward and one reverse transmission speeds.

13. A transmission assembly comprising: a housing; an input shaft and an output shaft; a plurality of compounded planetary gear systems in said housing, each having sun, planet and ring gears for transmitting power from said input shaft to said output shaft; means for selectively drive connecting said input shaft to either or both of the sun and ring gears of a first one of said planetary systems; planet gear carriers for the planet gears of all said planetary systems, all said carriers being directly drive connected to and coaxially rotatable with said output shaft; the planet gears of a second of said planetary systems comprising dual sets of intermeshed pinion gears, one meshed with the second planetary ring gear and one meshed with the second planetary sun gear, one of said intermeshed pinion gears of each set being coaxially fixed to rotate as a unit with an associated planet pinion gear of the first planetary system and all planet gears of said first and second planetary systems being carried on one of said carriers; means integrally joining the second planetary system sun gear and a third planetary system ring gear; and means connected to said housing for selectively braking each ring gear of each planetary system and the sun gear of said third planetary system.

14. A transmission assembly comprising: a housing; an input shaft and an output shaft; a plurality of compounded planetary gear systems in said housing, each having sun, planet and ring gears for transmitting power from said input shaft to said output shaft; means for selectively drive connecting said input shaft to either or both of the sun and ring gears of a first one of said planetary systems; carrier means, for the planet gears of all said planetary systems, directly drive connected to said output shaft; the planet gears of a second of said planetary systems comprising dual sets of intermeshed pinion gears, one meshed with the second planetary system ring gear and one meshed with the second planetary system sun gear, one of said intermeshed pinion gears of each set being coaxially fixed to rotate as a unit with an associated planet pinion gear of the first planetary system and said carrier means for the planet gears of the first planetary system and the planet gears of the second planetary system being a common assembly; means connected to said housing for selectively braking each ring gear of each planetary system and the sun gear of the second planetary system, and means connected between said output shaft and the sun gear of said second planetary system for modifying the speed output ratio of said compounded planetary gear systems.

15. A vehicle drive mechanism including a multi-stage revolving housing type hydraulic torque converter input unit with a multi-speed planetary transmission unit having a plurality of compounded planetary gear systems and power transmission means enabling input rotation of selected components of one of said planetary gear systems, a unitary converter output and transmission input shaft, said transmission having a separable front transmission housing section adapted to mount said hydraulic torque converter, and a hydraulic system common to said torque converter and said transmission unit including fluid communication means disposed in and passing through said front transmission housing section in control connection with said power transmission.

16. In combination with a multi-speed transmission having a housing with front and rear walls, a transfer gear transmission means mounted on the rear of the housing of said multi-speed transmission comprising: an upper output shaft coaxially aligned with the output shaft of said multi-speed transmission, clutch means between said multi-speed transmission output shaft and said upper output shaft, a lower output shaft in said gear transmission means parallel with said upper output shaft, transfer gearing in said transfer gear transmission means, means providing controllable drive engagement between said multi-speed transmission output shaft, said transfer gearing and said lower output shaft, a fore and aft tunnel through the lower portion of said housing walls; means sealing between said tunnel and said front and said rear walls, an output front drive shaft drivingly coupled to said lower output shaft and projecting forwardly from said rear mounted transfer transmission gear means through said tunnel.

17. For use in a drive transmission having an output shaft, a transfer transmission comprising: a housing including spaced apart substantially parallel vertical walls; a first output member; means on said housing journalling one end of said first output member in coaxial alignment with said transmission output shaft; three parallel shafts disposed between said vertical walls; a first one of said shafts being journalled in said vertical walls, drive connected to said drive transmission output shaft, including a drive gear and journalling one end of said first output member; a second one of said shafts mounted in said walls and providing a mount for an idler gear meshed with said drive gear; and the third one of said shafts being journalled in said vertical walls and extending through both of said vertical walls to provide second and third in-line output members; a driven gear journalled on said third output shaft and meshed with said idler gear; means for selectively engaging said first output member to said first shaft; and means for selectively engaging said third shaft to said driven gear.

18. A vehicle drive mechanism as defined in claim 5 wherein said transfer gear means and clutch means is within said transmission housing and said power take-off shaft extends through the rear wall of said sump.

19. A vehicle drive mechanism as defined in claim 5 wherein said transfer gear means and clutch means is mounted on the exterior of the output end of said transmission housing, a tunnel is provided entirely through said sump and said power take-off shaft extends through said tunnel.

20. A drive mechanism comprising: a transmission housing; an input mechanism with an input component and dual output components and a clutch means for selectively drive connecting either one or both of said output components to said input component; a compounded planetary transmission comprising two input means, an intermediate means and one output means, and means for selectively braking each of only one of said two input means and said intermediate means of said compounded planetary system; a further planetary transmission having enmeshd ring gear means, planet and carrier means and sun gear means, one of said three means in said further planetary system being secured to rotate with said one output means, a second of said three means being secured to rotate with said intermediate means and further brake means selectively operable to brake the third of said three means to thereby modify the reduction ratio through said compounded planetary transmission.

21. A drive mechanism comprising: a transmission housing; a multi-speed planetary system transmission in said housing including an input member and comprising an output shaft, a plurality of planetary systems in compounded arrangement having planet pinion carrier means directly connected to and rotatable with said output shaft, at least two clutch devices for selectively connecting said input member to either one or both of the sun and ring gears of one of said planetary systems, at least one other of said planetary systems consisting of dual sets of intermeshed pinions one of which is meshed with the ring gear of its planetary system and the other of which is meshed with the sun gear of its planetary system, means for selectively braking the ring gears of each planetary system, and means for braking the sun gear of the planetary system having dual sets of planet pinions; and a further planetary gear system with a ring gear component, a sun gear component and a planet and carrier component, one of said components being secured to rotate with said output shaft, a second of said components being secured to rotate with said sun gear of said one other of said planetary systems and means for selectively braking the third of said components to thereby modify the reduction ratio through said compounded planetary systems.

22. A drive mechanism comprising: a transmission housing; a multi-speed planetary system transmission in said housing including an input member and comprising an output shaft, a plurality of planetary systems in compounded arrangement having planet pinion carrier means directly connected to and rotatable with said output shaft, at least two clutch devices for selectively connecting said input member to either one or both of the sun and ring gears of one of said planetary systems, at least one other of said planetary systems consisting of dual sets of intermeshed pinions one of which is meshed with the ring gear of its planetary system and the other of which is meshed with the sun gear of its planetary system, means for selectively braking the ring gears of each planetary system, and means for braking the sun gear of the planetary system having dual sets of planet pinions; a further planetary gear system with a ring gear component, a sun gear component and a planet and carrier component, one of said components being secured to rotate with said output shaft, a second of said components being secured to rotate with said sun gear of said one other of said planetary systems and means for selectively braking the third of said components to thereby modify the reduction ratio through said compounded planetary systems; and a transfer gear means mounted on said housing, including an output shaft extending through said transmission housing in parallel offset relationship with said multi-speed planetary system transmission and a clutch device for selectively drive connecting said transfer gear means to said multi-speed planetary system.

References Cited in the file of this patent
UNITED STATES PATENTS

| | | |
|---|---|---|
| 1,256,373 | Rowledge | Feb. 12, 1918 |
| 2,190,259 | Custenborder | Feb. 13, 1940 |
| 2,214,335 | Kurti | Sept. 10, 1940 |
| 2,229,345 | Shotz | Jan. 21, 1941 |
| 2,415,758 | Peterson et al. | Feb. 11, 1947 |
| 2,432,358 | Warner | Dec. 9, 1947 |
| 2,591,342 | Dodge | Apr. 1, 1952 |
| 2,603,238 | Trail | July 15, 1952 |
| 2,640,373 | Jandasek | June 2, 1953 |
| 2,684,692 | Hunter et al. | July 27, 1954 |
| 2,689,030 | Wemp | Sept. 14, 1954 |
| 2,690,192 | Dannhardt | Sept. 28, 1954 |
| 2,691,940 | McFarland | Oct. 19, 1954 |
| 2,722,946 | Mueller | Nov. 8, 1955 |
| 2,726,748 | Quistgaard et al. | Dec. 13, 1955 |
| 2,770,151 | Cartwright et al. | Nov. 13, 1956 |
| 2,823,552 | Haverlender | Feb. 18, 1958 |
| 2,844,973 | Hill | July 29, 1958 |